United States Patent
Resch et al.

(10) Patent No.: US 9,219,604 B2
(45) Date of Patent: Dec. 22, 2015

(54) GENERATING AN ENCRYPTED MESSAGE FOR STORAGE

(75) Inventors: Jason K. Resch, Chicago, IL (US); Wesley Leggette, Oak Park, IL (US)

(73) Assignee: Cleversafe, Inc., Chicago, IL (US)

( * ) Notice: Subject to any disclaimer, the term of this patent is extended or adjusted under 35 U.S.C. 154(b) by 243 days.

(21) Appl. No.: 13/449,950

(22) Filed: Apr. 18, 2012

(65) Prior Publication Data

US 2012/0290830 A1    Nov. 15, 2012

Related U.S. Application Data

(60) Provisional application No. 61/483,846, filed on May 9, 2011.

(51) Int. Cl.
| | |
|---|---|
| *H04L 9/00* | (2006.01) |
| *G06F 21/00* | (2013.01) |
| *H04L 9/08* | (2006.01) |
| *H04L 9/30* | (2006.01) |

(52) U.S. Cl.
CPC ............ *H04L 9/0841* (2013.01); *H04L 9/3093* (2013.01)

(58) Field of Classification Search
CPC ....... G06F 21/79; G06F 21/80; H04L 9/0841; H04L 9/3006; H04L 9/3093
USPC ......... 713/150, 160–162, 168–171, 189–193; 726/5, 6; 380/28, 30, 44, 255, 285; 711/100, 164; 709/206, 228
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A * | 11/1999 | Garay et al. ................. 713/165 |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |

(Continued)

OTHER PUBLICATIONS

Amos Beimel et al, Secret sharing with Public Reconstruction, IEEE 1998.*

(Continued)

*Primary Examiner* — Shanto M Abedin
(74) *Attorney, Agent, or Firm* — Garlick & Markison; Timothy W. Markison

(57) ABSTRACT

A method begins by a dispersed storage (DS) processing module generating a shared secret key from a public key of another entity and a private key using a first modulo prime polynomial function, wherein a public key is generated from the private key using a second modulo prime polynomial function and wherein the public key of the other entity is derived using the second modulo prime polynomial function on a private key of the other entity. The method continues with the DS module encrypting a message using the shared secret key to produce an encrypted message. The method continues with the DS module outputting the encrypted message to the other entity.

22 Claims, 18 Drawing Sheets

(56) References Cited

U.S. PATENT DOCUMENTS

| | | | |
|---|---|---|---|
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,987,855 B1* | 1/2006 | Srivastava | 380/278 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,315,950 B1* | 1/2008 | Baransky et al. | 713/193 |
| 7,636,724 B2 | 12/2009 | de la Torre et al. | |
| 7,958,356 B1* | 6/2011 | Subramanian et al. | 713/171 |
| 8,744,071 B2* | 6/2014 | Leggette et al. | 380/28 |
| 8,861,727 B2* | 10/2014 | Resch et al. | 380/46 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0083368 A1* | 4/2004 | Gehrmann | 713/171 |
| 2004/0122917 A1 | 6/2004 | Menon et al. | |
| 2004/0215998 A1 | 10/2004 | Buxton et al. | |
| 2004/0228484 A1* | 11/2004 | Yanagisawa | 380/44 |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0083766 A1* | 4/2007 | Farnham et al. | 713/176 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0034216 A1* | 2/2008 | Law | 713/183 |
| 2008/0301459 A1* | 12/2008 | Ebeid | 713/180 |
| 2009/0094251 A1 | 4/2009 | Gladwin et al. | |
| 2009/0094318 A1 | 4/2009 | Gladwin et al. | |
| 2009/0161870 A1* | 6/2009 | Rosenberg | 380/268 |
| 2009/0185677 A1* | 7/2009 | Bugbee | 380/28 |
| 2009/0249072 A1* | 10/2009 | Kim | 713/171 |
| 2009/0254760 A1* | 10/2009 | Komarla et al. | 713/189 |
| 2010/0023524 A1 | 1/2010 | Gladwin et al. | |
| 2010/0205443 A1* | 8/2010 | Zhao et al. | 713/171 |
| 2011/0107094 A1* | 5/2011 | Resch et al. | 713/168 |
| 2011/0213977 A1* | 9/2011 | Little | 713/171 |
| 2011/0286594 A1* | 11/2011 | Resch et al. | 380/46 |
| 2011/0286595 A1* | 11/2011 | Resch et al. | 380/46 |
| 2011/0289366 A1* | 11/2011 | Baptist et al. | 714/54 |

OTHER PUBLICATIONS

Hugo Krawczyk, Secret Sharing Made Short, Springer-Verlag, 1998.*

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

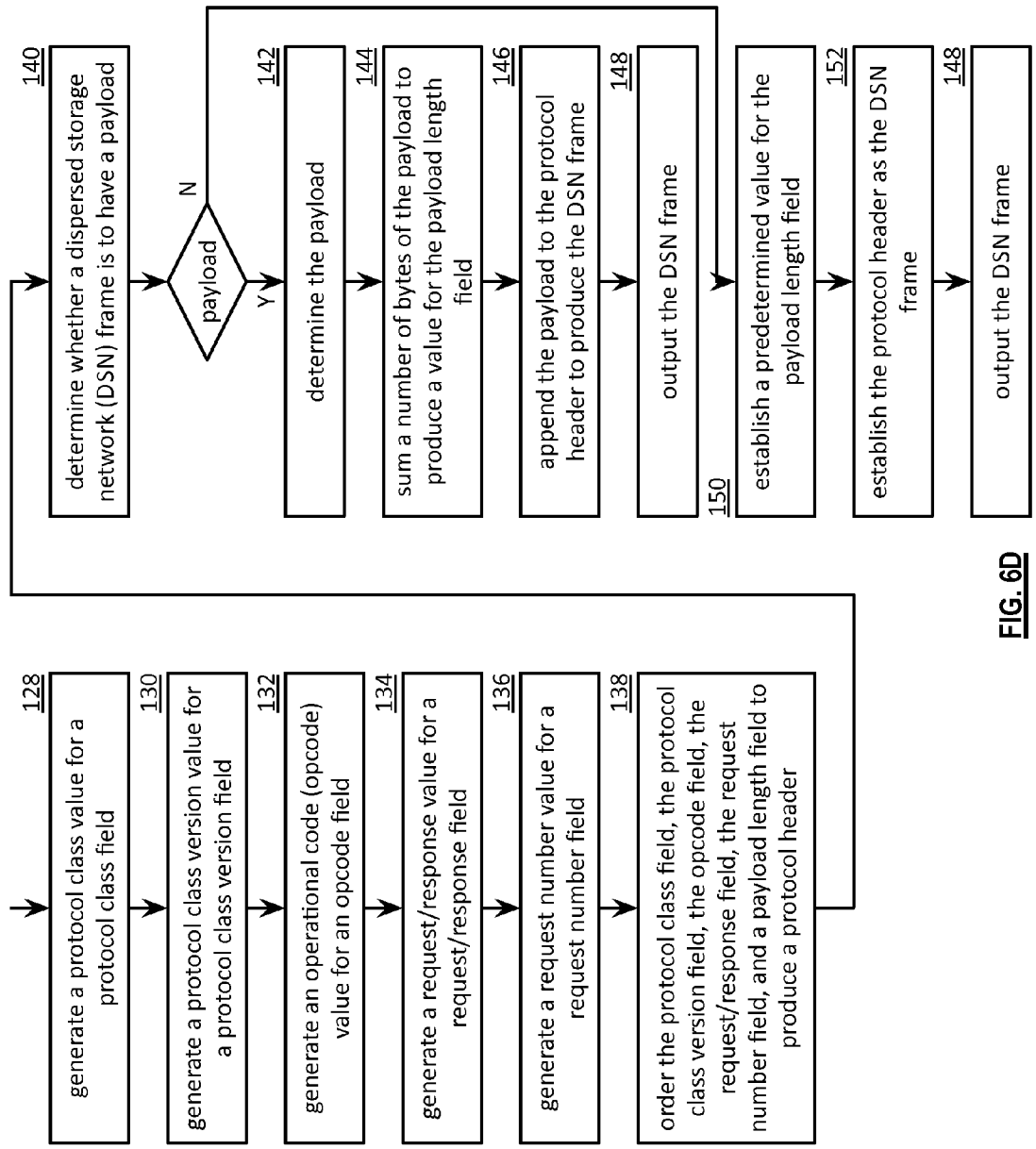

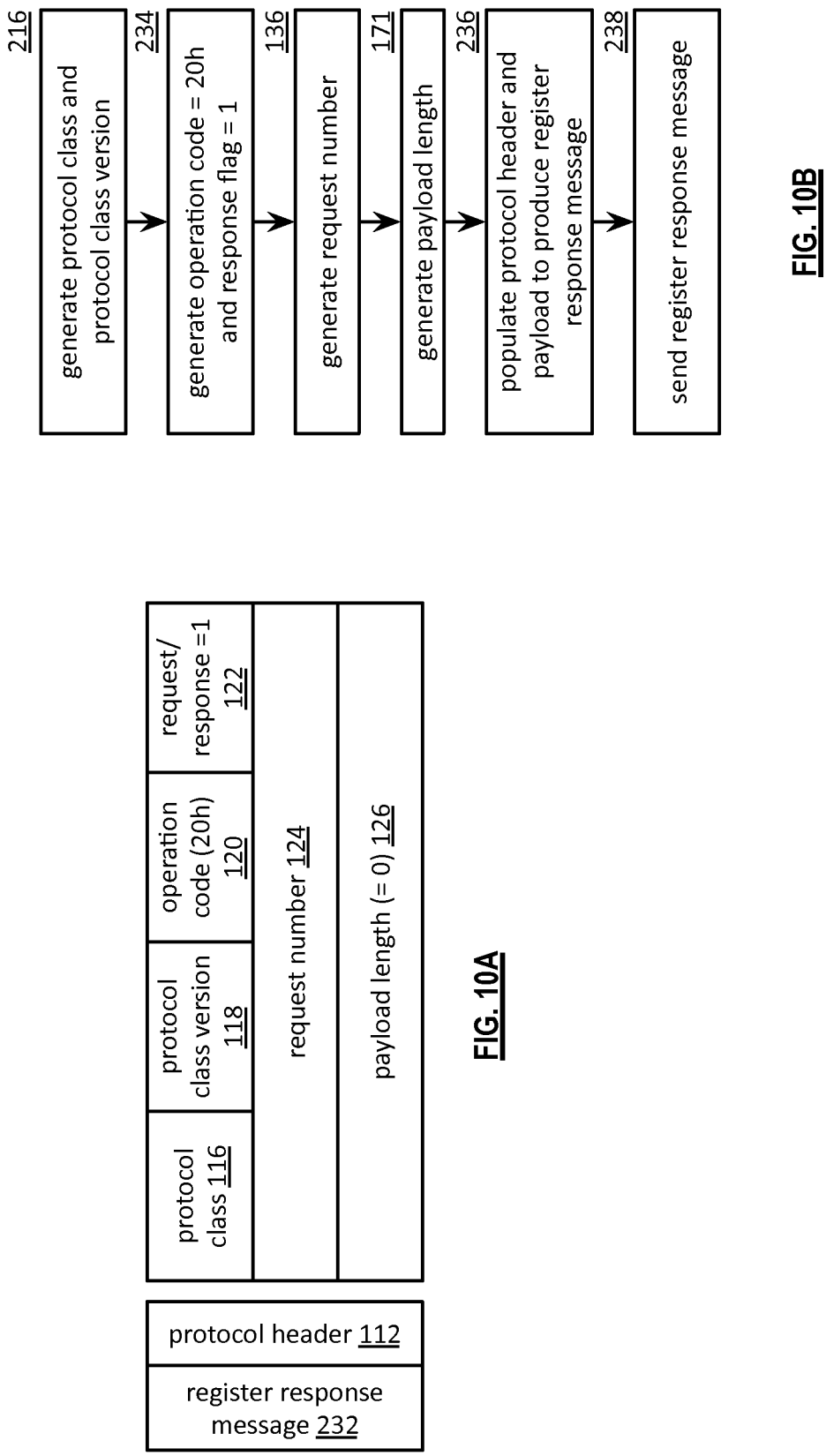

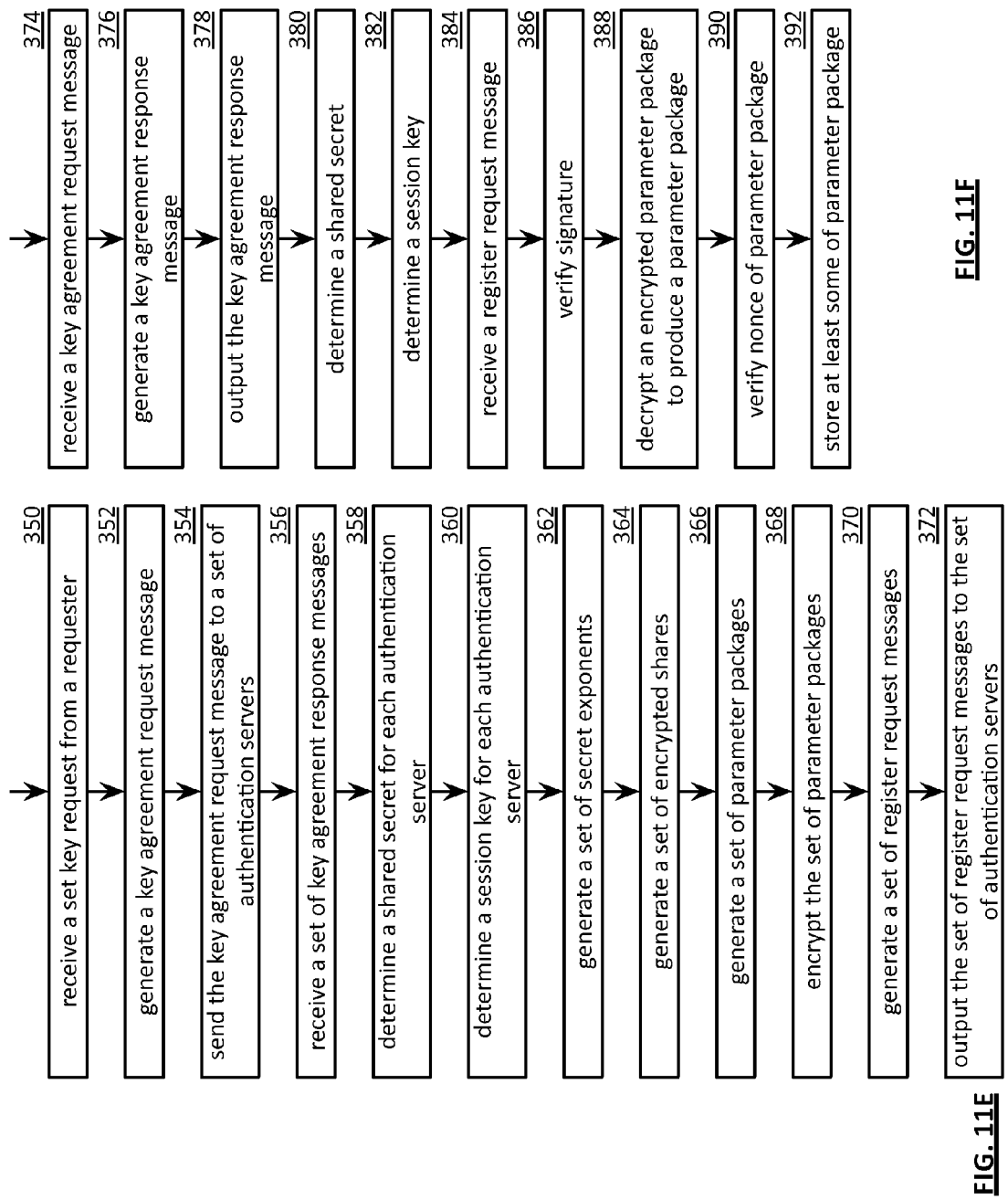

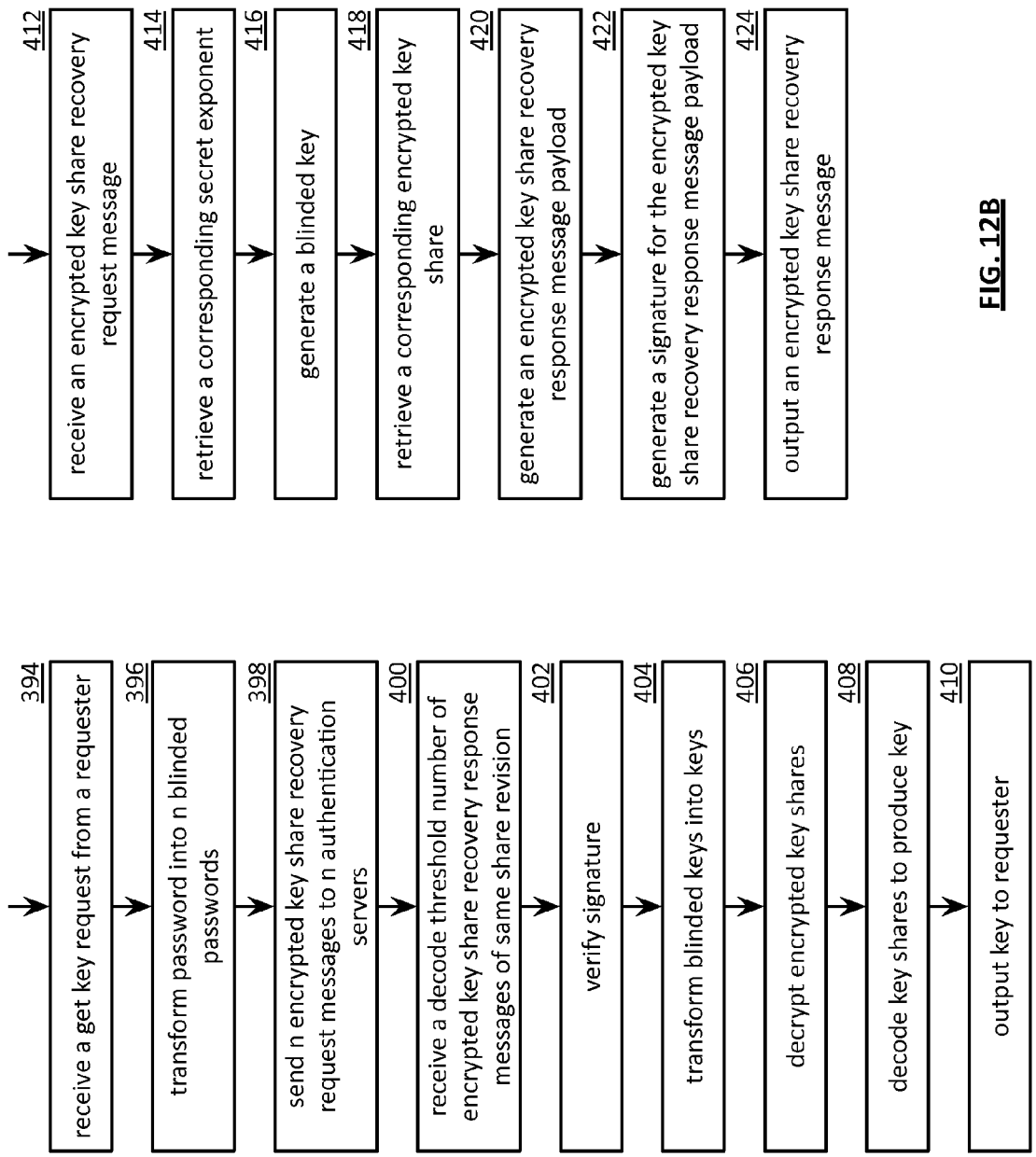

GENERATING AN ENCRYPTED MESSAGE FOR STORAGE

CROSS REFERENCE TO RELATED PATENTS

The present U.S. Utility Patent Application claims priority pursuant to 35 U.S.C. §119(e) to U.S. Provisional Application No. 61/483,846, entitled "Key Storage Protocol Utilizing a Dispersed Storage Network," filed May 9, 2011, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6D is a flowchart illustrating an example of generating a protocol header of a dispersed storage network (DSN) frame in accordance with the present invention;

FIG. 10A is a diagram illustrating an example of a register response message format in accordance with the present invention;

FIG. 10B is a flowchart illustrating an example of generating a register response message in accordance with the present invention;

FIG. 11E is a flowchart illustrating an example of storing a key in accordance with the present invention;

FIG. 11F is a flowchart illustrating an example of storing an encrypted key share in accordance with the present invention;

FIG. 12A is a flowchart illustrating example of retrieving a key in accordance with the present invention;

FIG. 12B is a flowchart illustrating an example of retrieving an encrypted key share in accordance with the present invention.

DETAILED DESCRIPTION OF THE INVENTION

Figure 1:
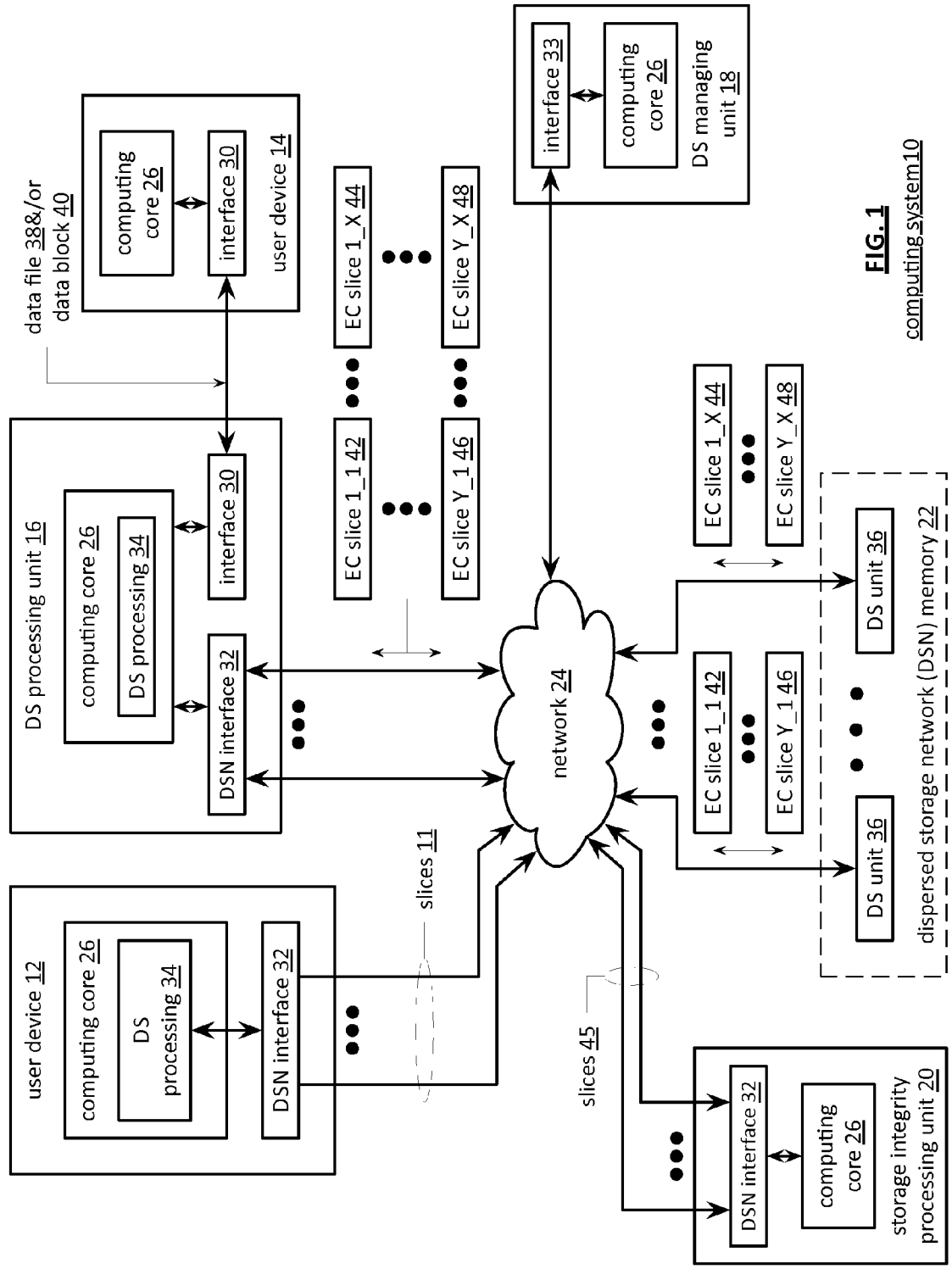
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or unit' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
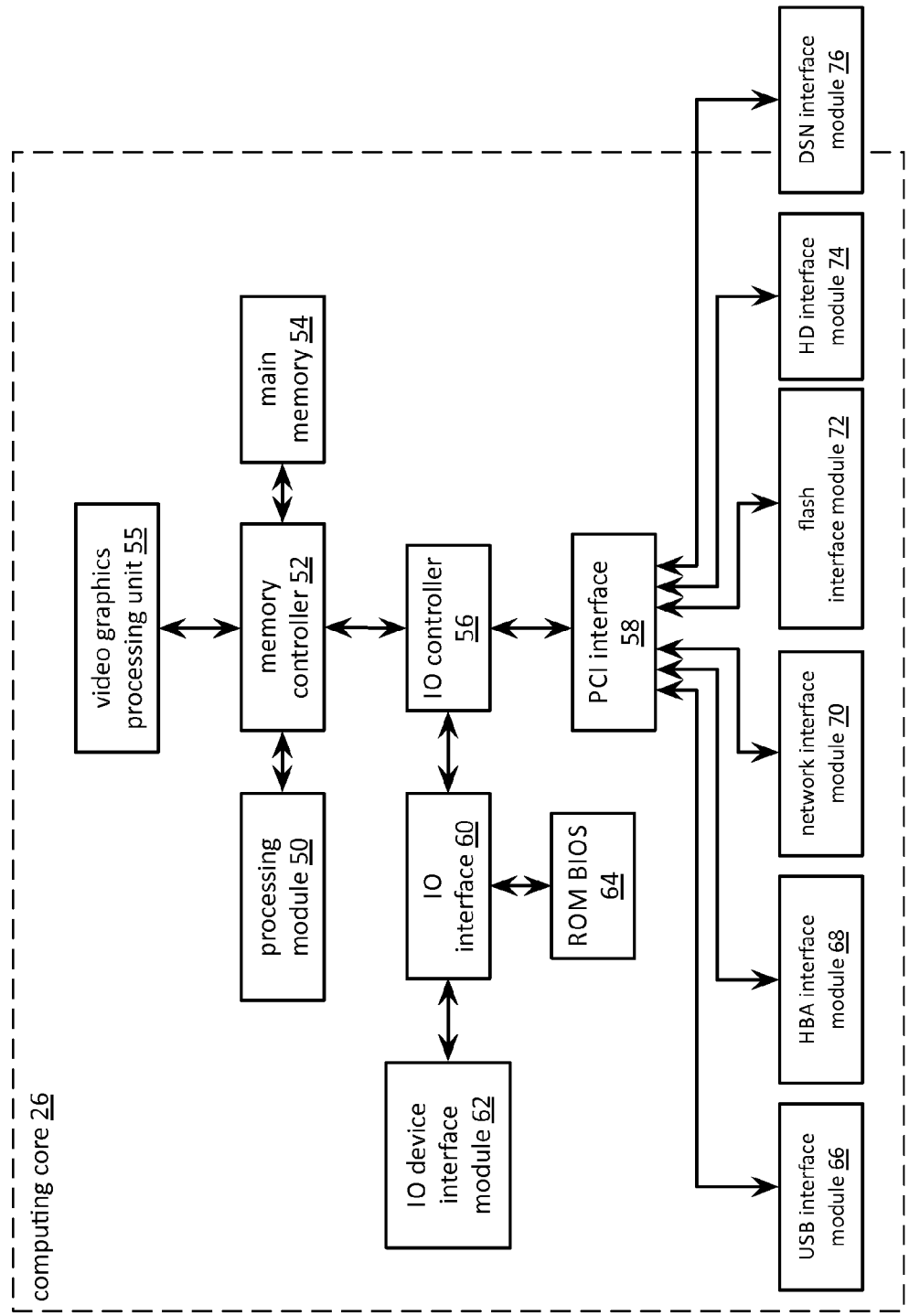
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the 10 device interface module 62 and/or the memory interface modules may be collectively or individually referred to as 10 ports.

Figure 3:
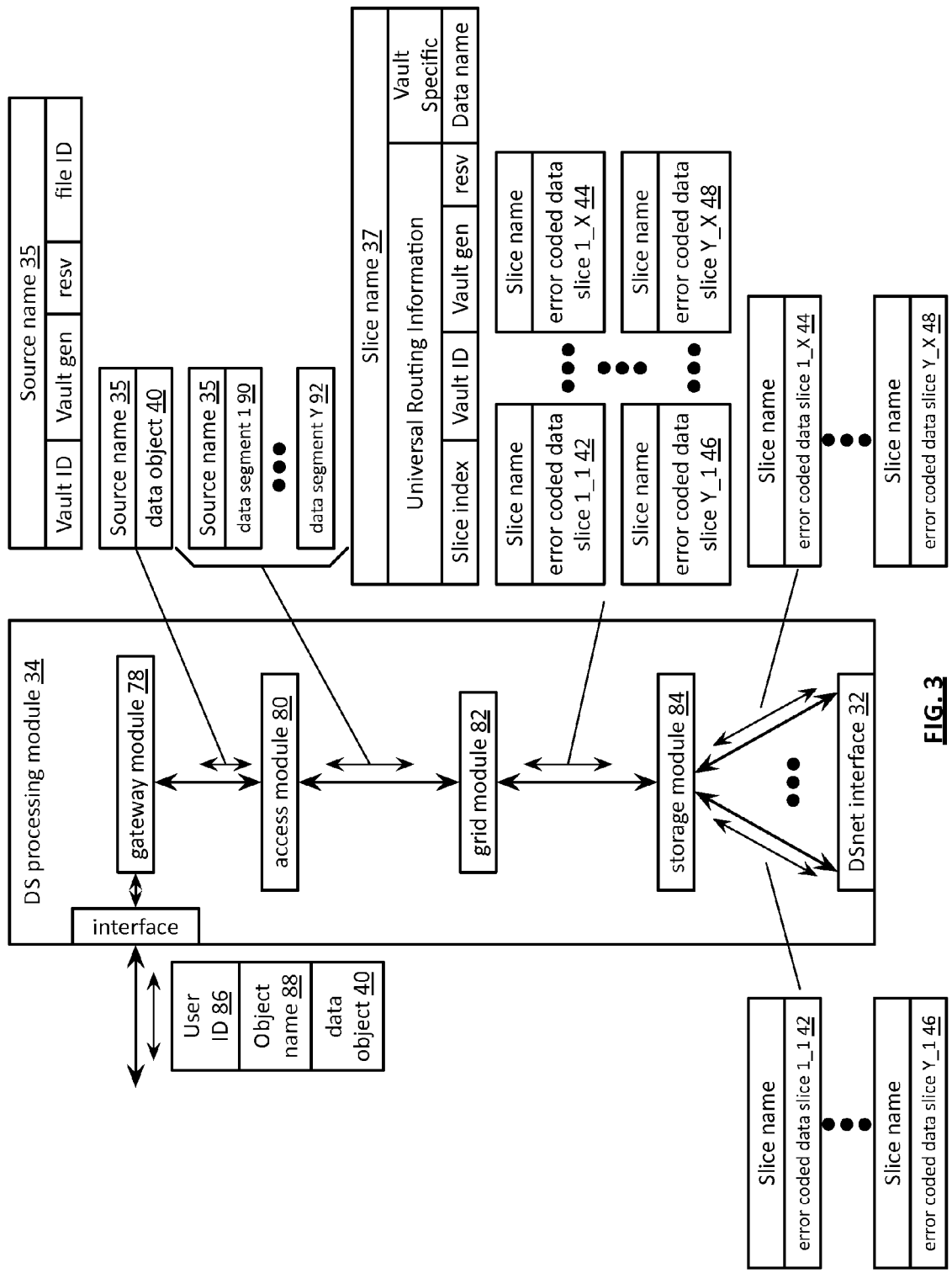
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131, 072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
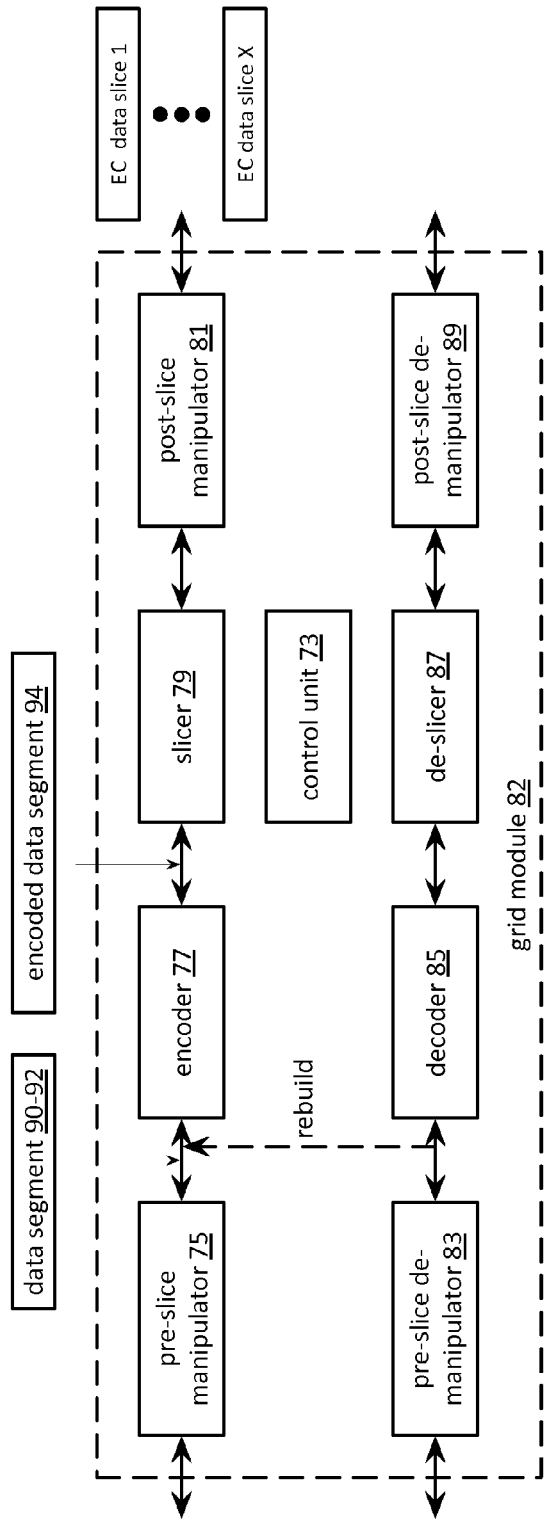
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
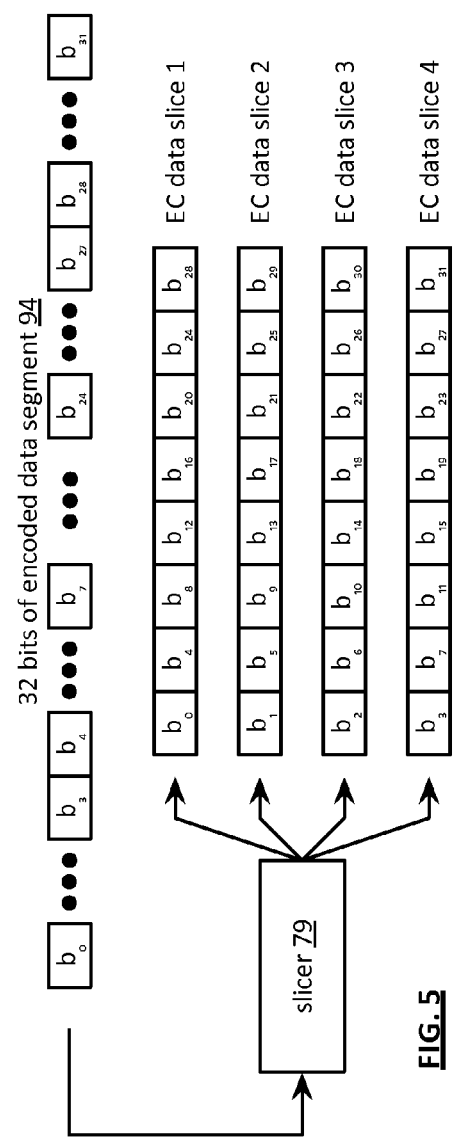
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6B:
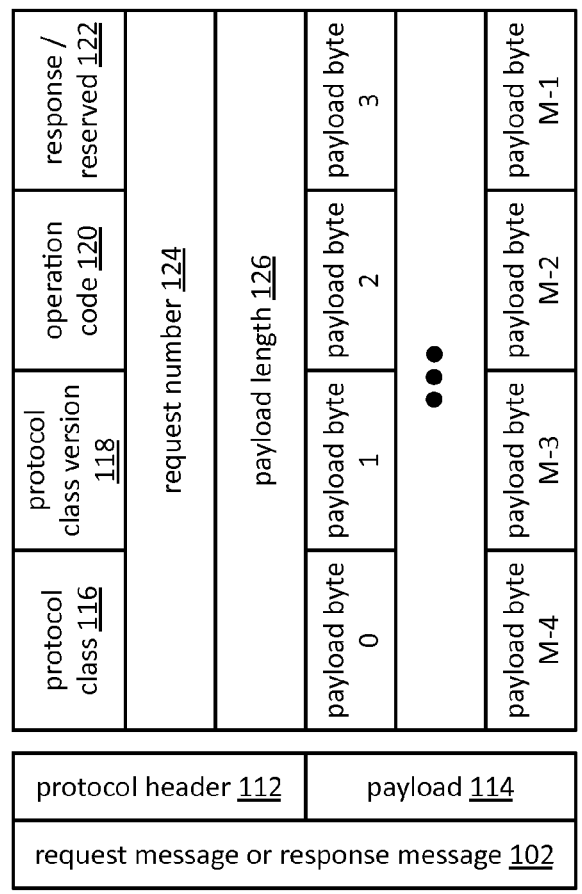
FIG. 6B is a diagram of an embodiment of a message format in accordance with the present invention.
Figure 6A:
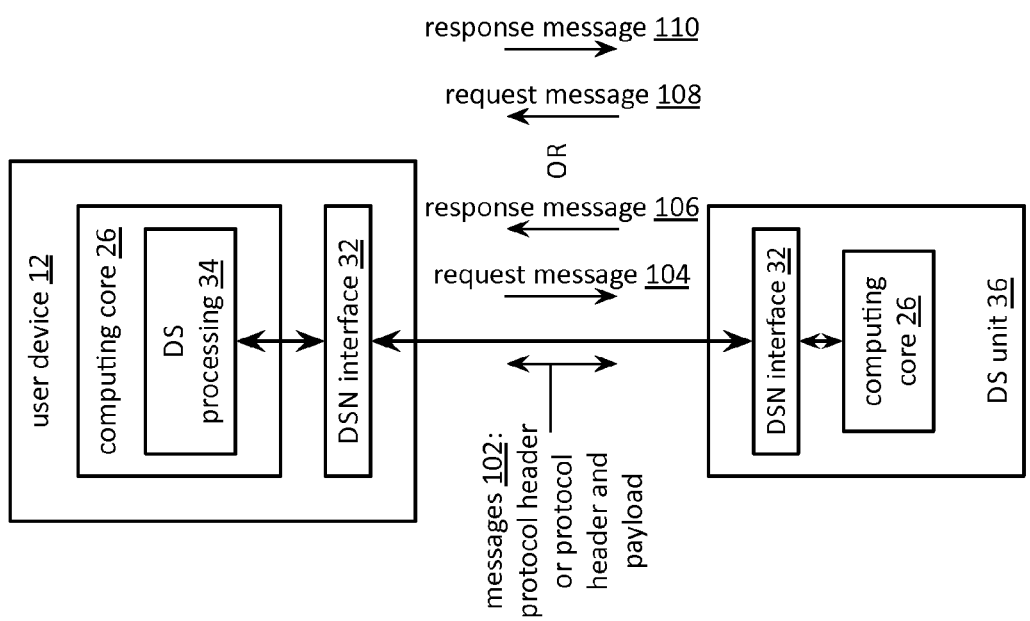
FIG. 6A is a schematic block diagram of another embodiment of a computing system in accordance with the present invention.

FIG. 6A is a schematic block diagram of another embodiment of a computing system that includes a user device 12 and a dispersed storage (DS) unit 36. The user device 12 includes a computing core 26 and a dispersed storage network (DSN) interface 32. The computing core 26 includes a DS processing 34. The DS unit 36 includes a computing core 26 and the DSN interface 32. The user device 12 and the DS unit 36 are operably coupled via a local area network, a wide area network, the internet, et cetera to enable the DSN interface 32 of the user device 12 and of the DS unit 36 to communicate. The DSN interface 32 of the user device 12 and/or of the DS unit 36 generates one or more DSN frames to communicate a message 102 therebetween. The DSN frame includes a protocol header and may further include a payload. A format of the DSN frame is discussed in greater detail with reference to FIG. 6B.

A message 102 may be a request message 104, 108 (e.g., key agreement, register, read, write, checked write, write commit, write rollback, write finalize, write undo, check request, list request, and/or list digest request) or a response message 106, 110. For example, user device 12, as a requester, generates a request message 104, 108 and sends it to DS unit 36. DS unit 36, as a responder, generates a response message 106, 110 and sends it to user device 12. In this example, the DS processing 34 of the user device 12 (e.g., the requester) generates a request and outputs the request to the DSN interface 32 of the user device 12. The DSN interface 32 of the user device 12 formats the request into the request message 104 (which includes a DSN frame or DSN frames) and sends it to the DS unit 36 (e.g., the responder). The DSN interface of the DS unit 36 extracts the request from the request message 104 and provides the request to the computing core 26, which generates a response thereto. The computing core 26 provides the response to the DSN interface 32 of the DS unit 36, which formats the response into the response message 106 (which includes one or more DSN frames) and sends it to user device 12.

Requester and responder roles may change depending on which device of the system initiates the request/response message pair. For example, DS unit 36 (e.g., the requester) generates a request message 108 and sends it to the user device 12 (e.g., the responder). The user device 12 generates a response message 110 and sends it to the DS unit 36. Various modules and/or units of the system may utilize the request/response message pairs. In addition, a request may send a request message 104, 108 to multiple responders in a series and/or parallel manner as will be discussed in greater detail with reference to FIG. 6C.

FIG. 6B is a diagram of an embodiment of a response or request message formatted as a dispersed storage network (DSN) frame. The DSN frame includes a protocol header 112 and may further include a payload 114. The protocol header 112 includes information to request action and/or provide status. The payload 114 includes M payload bytes of supplemental information utilized in further action and/or in a response related to the information in the protocol header 112.

In an example, the protocol header 112 includes one or more of a protocol class field 116, a protocol class version field 118, an operation code field 120, a request/response field 122, a request number field 124, and a payload length field 126. The protocol class field 116 contains a number of bytes to specify a sub-protocol identifier to enable a plurality of families of protocols to be utilized. For example, the protocol class field 116 is one byte in length and includes a protocol class value of 01 hex to signify a first protocol class. The protocol class version field 118 contains a number of bytes to specify a sub-protocol version associated with the protocol class 116 enabling a plurality of versions of protocols to be utilized with each protocol class. For example, the protocol class version field is one byte in length and includes a protocol class version value of 01 hex to signify a first protocol class version.

The operation code field 120 contains a number of bytes to specify an operation code associated with a requested action providing message interpretation instructions to a message target. For example, the operation code field is one byte in length and includes an operation code value of a read operation. The request/response field 122 contains a number of bytes to specify whether the message is a request message or a response message. For example, the request/response field 122 is one byte in length and a one-bit flag of the byte (e.g., a most significant bit of the byte) indicates a response/reserve value. For example, a flag value of zero indicates that the message is a request message and a flag value of one indicates that the message is a response message.

The request number field 124 contains a number of bytes to include a request number value to associate at least one request message with at least one response message. The request number value may be produced as at least one of a random number, a random number plus a predetermined number, and based on a previous request number. For example, the request number field 124 is four bytes in length and includes a request number value of 457 to associate a read request message with a read response message when the previous request number value is 456. As another example, the request number field 124 includes a request number value of 5,358 to associate a read response message with a read request message when a request number value of 5,358 is extracted from the read request message.

The payload length field 126 contains a number of bytes to include a payload length value to indicate a number of bytes contained in the payload 114. The payload length value may be determined based on one or more of counting bytes of the payload 114, utilizing a predetermined number based on one or more of the protocol class value, the protocol class version value, the operation code value, and the response/reserved value. For example, the payload length field 126 is four bytes in length and includes a payload length value of zero when the operation code value is associated with a write rollback response operation and the response/reserved value is associated with a response message. As another example, the payload length field 126 includes a payload length value of 104 when the operation code value is associated with a read request message and a predetermined formula of 48n+8 associated with the read request message is utilized (e.g., where n=2 corresponding to 2 slice names).

The payload 114 may be organized into one or more payload fields in accordance with one or more of the values of the protocol class field 116, protocol class version field 118, the operation code field 120, and the request/response field 122. The one or more payload fields include payload bytes 0-M, wherein values of the payload bytes 0-M are established in accordance with the one or more payload fields. For example, the one or more payload fields include slice name fields when the payload 114 is associated with a read request DSN frame. As another example, the one or more payload fields include one or more encoded data slices when the payload 114 is associated with a read response DSN frame.

Figure 6C:
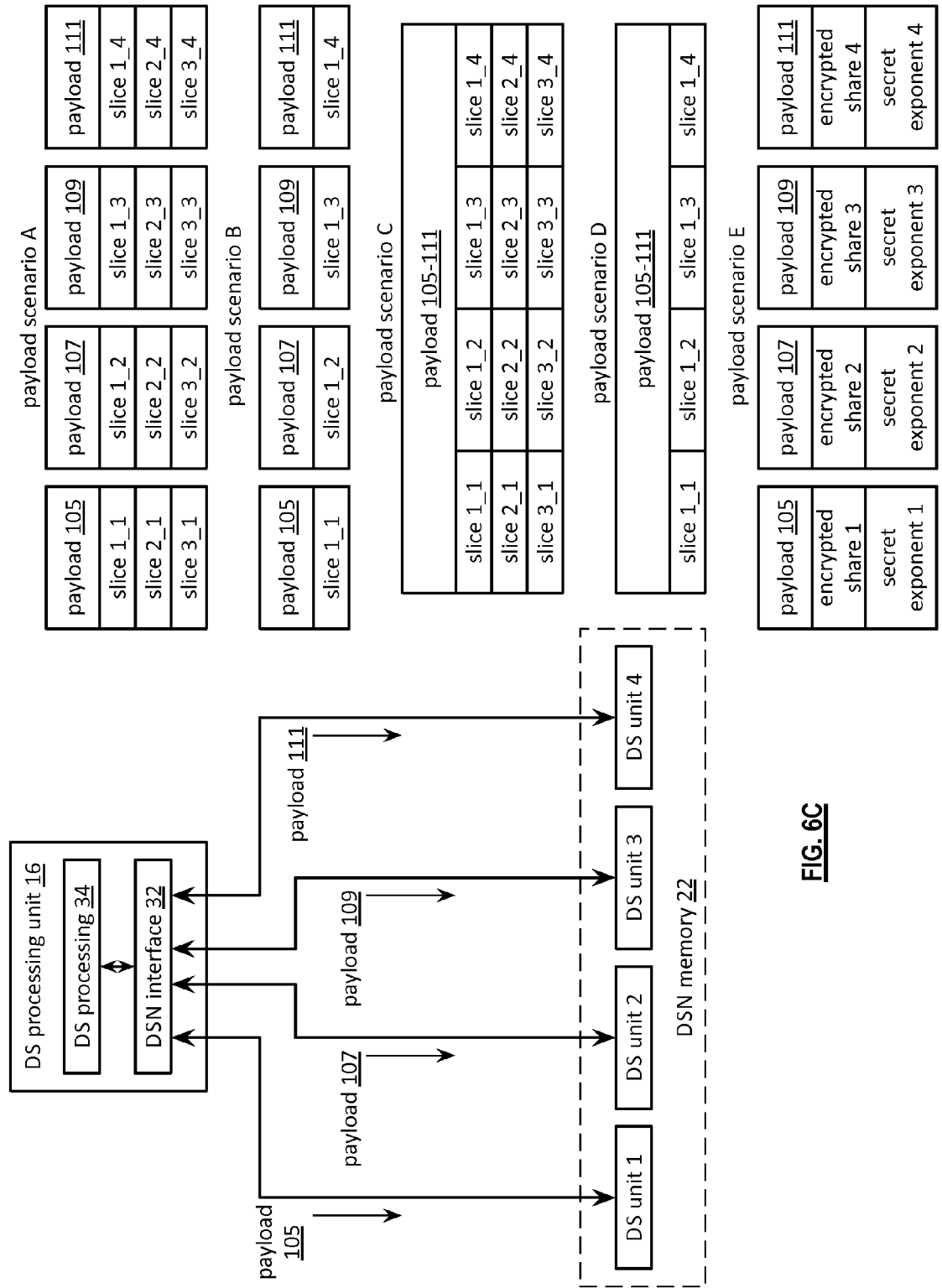
FIG. 6C is a schematic block diagram of another embodiment of a computing system in accordance with the present invention.

FIG. 6C is a schematic block diagram of another embodiment of a computing system that includes a dispersed storage (DS) processing unit 16 and dispersed storage network (DSN) memory 22 operable to process a plurality of payload scenarios A-E. The DS processing unit 16 includes a DS processing 34 and a DSN interface 32. The DSN memory 22 includes DS units 1-4 when dispersed storage error coding parameters include a pillar width of 4. The DS processing unit 16 generates one or more request DSN frames (e.g., a common DSN frame for the DS units or an individual frame for each DS unit) wherein each DSN frame includes a payload. The DS processing unit 16 sends the one or more request DSN frames to DS units 1-4. For example, the DS processing unit 16 sends a first DSN frame that includes a payload 105 to DS unit 1, sends a second DSN frame that includes a payload 107 to DS unit 2, sends a third DSN frame that includes a payload 107 to DS unit 3, and sends a fourth DSN frame that includes a payload 111 to DS unit 4. Each payload 105-111 may contain unique data or may contain the same data. As a specific example, the DS processing unit 16 produces a plurality of encoded data slices, generates one or more write request messages that include the plurality of encoded data slices within one or more write request DSN frames, and sends the one or more write request DSN frames to the DSN memory 22 to facilitate storing the plurality of encoded data slices in the DS units 1-4. As another specific example, the DS processing unit 16 produces a plurality of encrypted shares, generates one or more write request messages that include the plurality of encrypted shares within one or more write request DSN frames, and sends the one or more write request DSN frames to the DSN memory 22 to facilitate storing the plurality of encrypted shares in the DS units 1-4.

In an example of operation, the DS processing 34 dispersed storage error encodes data utilizing the dispersed storage error coding parameters to produce 3 sets of encoded data slices 1_1 through 3_4 (e.g., set one includes slices 1-1 through 1_4). The DS processing 34 outputs a write request that includes three sets of encoded data slices to the DSN interface 32. The DSN interface 32 generates at least one write request DSN frame that includes a payload section, which includes an encoded data slice(s) of the three sets of encoded data slices. The DSN interface 32 sends the write request DSN frame(s) to the DS units 1-4. For instance, the DS interface 32 sends the write request DSN frame that includes payload 105 to DS unit 1; sends the write request DSN frame that includes payload 107 to DS unit 2; sends the write request DSN frame that includes payload 109 to DS unit 3: and sends the write request DSN frame that includes payload 111 to DS unit 4.

The DS processing unit 16 selects an encoded data slice to include in each of the payloads 105-111 in one of a variety of ways. For example, the DS processing unit 16 selects slices having the same pillar number to include in a payload (e.g., pillar one slices of the sets of encoded data slices are included in the payload 105). As another example, DS processing unit 16 selects the encoded data slices of a set of encoded data slices to include in a payload. As yet another example, the DS processing unit 16 selects a slice to include in the payload. As a further example, the DS processing unit 16 selects the encoded data slices of the three sets of encoded data slices to include in the payload.

The payload scenarios A-D represent example scenarios indicating which encoded data slices of the three sets of encoded data slices are included in the payloads 105-107. Payload scenario A represents a scenario where the DS processing unit 16 selects all slices of the corresponding pillar of the three sets of encoded data slices per payload. For example, the DS processing unit 16 selects slices 1_1, 2_1, and 3_1 of pillar 1 to be included in payload 105, slices 1_2, 2_2, and 3_2 of pillar 2 to be included in payload 107, slices 1_3, 2_3, and 3_3 of pillar 3 to be included in payload 109, and slices 1_4, 2_4, and 3_4 of pillar 4 to be included in payload 111. Payload scenario B represents a scenario where the DS processing unit 16 selects one slice of the corresponding pillar of the three sets of encoded data slices per payload. For example, the DS processing unit 16 selects slice 1_1 of pillar 1 to be included in payload 105, slice 1_2 of pillar 2 to be included in payload 107, slice 1_3 of pillar 3 to be included in payload 109, and slice 1_4 of pillar 4 to be included in payload 111.

Payload scenario C represents a scenario where the DS processing unit 16 selects all encoded data slices of the three sets of encoded data slices for all payloads 105-111. For example, the DSN interface 32 selects slices 1_1, 1_2, 1_3, 1_4, 2_1, 2_2, 2_3, 2_4, 3_1, 3_2, 3_3, and 3_4 to be included in each payload of payloads 105-111. Payload scenario D represents a scenario where the DS processing unit 16 selects one of encoded data slices of the three sets of encoded data slices for all payloads 105-111. For example, the DSN interface 32 selects slices 1_1, 1_2, 1_3, and 1_4 to be included in each payload of payloads 105-111.

Payload scenario E represents a scenario where the DS processing unit 16 encodes a secret (e.g., a private key) to produce a plurality of secret shares for distributed storage in a plurality of DS units. In such a scenario, the DS processing unit 16 encodes the secret utilizing a secret encoding function to produce the plurality of secret shares. The secret encoding function includes a Shamir function and dispersed storage error encoding. For example, the DS processing unit 16 encodes the secret utilizing the Shamir function to produce four secret shares when a Shamir function width is four. The DS processing unit 16 encrypts the plurality of secret shares to produce a plurality of encrypted shares. The encrypting is in accordance with an encryption function, wherein the encryption function is based on a plurality of secret exponents. For example, the DS processing unit 16 encrypts the four secret shares utilizing the encryption function to produce encrypted shares 1-4, wherein a different secret exponent is utilized by the encryption function to encrypt each of the four secret shares.

The DS processing unit 16 aggregates corresponding encrypted shares and secret exponents for storage in each of the plurality of DS units. For example, the DS processing unit 16 aggregates encrypted share 1 and secret exponent 1 as payload 105, encrypted share 2 and secret exponent 2 as payload 107, encrypted share 3 and secret exponent 3 as payload 109, and encrypted share 4 and secret exponent 4 as payload 111. Next, the DS processing unit 16 sends payload 105 to DS unit 1 for storage, sends payload 107 to DS unit 2 for storage, sends payload 109 to DS unit 3 for storage, and sends payload 111 to DS unit 4 for storage. The method of operation to store such encrypted shares and secret exponents is discussed in greater detail with reference to FIGS. 11A-11F.

FIG. 6D is a flowchart illustrating an example of generating a protocol header of a dispersed storage network (DSN) frame. The method begins at step 128 where a processing module generates values for a protocol class field, a protocol class version field, and an operation code (opcode) field based on an operational function being communicated by the DSN frame. The operational function includes at least one of the key agreement operation, a registration operation, a read operation, a check operation, a list range operation, a write operation, a checked write operation, a commit operation, a rollback operation, a finalize operation, an undo operation, and a list digest operation.

The processing module generates a protocol class value for the protocol class field by at least one of: retrieving the protocol class value from a protocol class list based on the operational function, utilizing the protocol class value of a request DSN frame (e.g., a DSN frame that includes a request message) when the DSN frame is a response DSN frame (e.g., a DSN frame that includes a response message), retrieving the protocol class value from a support protocol class list, retrieving the protocol class value from a unit-module type protocol class list, and extracting the protocol class value from a negotiation result. For example, the processing module generates a protocol class value of 01 when the protocol class value of a corresponding read request DSN frame has value of 01 and the operational function is a read response.

The method continues at step 130 where the processing module generates a protocol class version field. The processing module generates a protocol class version value for the protocol class version field by at least one of utilizing a most recent protocol class version value, retrieving the protocol class version value from a protocol class version list based on the operational function, utilizing the protocol class version value of a request DSN frame when the DSN frame is a response DSN frame, retrieving the protocol class version value from a support protocol class version list, retrieving the protocol class version value from a unit-module protocol class version list, and extracting the protocol class version value from a negotiation result. For example, the processing module generates a protocol class version value of 03 based on retrieving the most recent protocol class version value from the support protocol class version list. As another example, processing module initiates a negotiation sequence when a protocol class error message is received (e.g., indicating that a present protocol class value and/or a present protocol class version value is unacceptable). The negotiation sequence includes one or more of generating a supported protocol class message, outputting the supported protocol class message, receiving a message that includes a supported protocol class list indicating supported protocol classes and/or protocol class versions, selecting at least one of a supported protocol class value and a protocol class version value from the supported protocol class list, and utilizing the at least one of the supported protocol class value and the supported protocol class version value.

The method continues at step 132 where the processing module generates an operation code field that includes an opcode value based on one or more of an operational function being communicated by the DSN frame, an opcode list, and a predetermination. For example, the processing module generates the operation code field to include an opcode value of 40 hex when the operational function being communicated by the DSN frame is a read request operation, the protocol class field value is 01, and the protocol class version field value is 03.

The method continues at step 134 where the processing module generates a request/response field to indicate a request message for a request message DSN frame or a response message for a response message DSN frame. For example, processing module generates the request/response field to include a value of zero when the DSN frame is the request message DSN frame. As another example, the processing module generates the request/response field to include a value of 1 when the DSN frame is the response message DSN frame.

The method continues at step 136 where the processing module generates a request number field that includes a request number value by at least one of transforming a random number generator output to produce the value, transforming a variable reference number to produce the value (e.g., a hash or block cipher encryption of the variable reference number which increments by one for each new request number value), adding an increment to a previous request number value to produce the value, selecting a predetermined number to produce the value, and utilizing a request number value of a request DSN frame when the DSN frame is a response DSN frame. For example, the processing module generates a request number value of 39,239 in a four byte wide request number field based on the random number generator output. As another example, the processing module generates a request number value of 9,093 when the previous request number value is 9,083 and the increment is 10. As yet another example, the processing module generates a request number value of 277 when the request number value of the request DSN frame is 277 and the DSN frame is a response DSN frame.

The method continues at step 138 where the processing module arranges, in order, values for the protocol class field, the protocol class version field, the opcode field, the request/response field, the request number field, and a payload length field to produce the protocol header. The method continues at step 140 where the processing module determines whether the DSN frame is to have a payload based on one or more values of one or more of the fields of the protocol header. For example, the processing module determines that the DSN frame is not to have the payload when the opcode value indicates a write commit response operation. As another example, the processing module determines that the DSN frame is to have the payload when the opcode value indicates a read request operation. The method branches to step 150 when the processing module determines that the DSN frame is not to have the payload. The method continues to step 142 when the processing module determines that the DSN frame is to have the payload.

The method continues at step 142 where processing module determines the payload as one of a request payload for a request message DSN frame and a response payload for a response message DSN frame. The determination may be based on one or more of the operational function, the values for the protocol class field, the protocol class version field, the request/response field, and the opcode field.

The method continues at step 144 where the processing module sums a number of bytes of the payload to produce a value for the payload length field. Alternatively, the processing module determines the value utilizing one or more of a payload length formula and a fixed value. The determination may be based on one or more of the operational function, the values for the protocol class field, the protocol class version field, the request/response field, and the opcode field. For example, the processing module determines to utilize a payload length formula of 8T to produce the value as a four byte payload length field, where T is the number of transaction numbers, when the operational function is a write commit request operation. As another example, the processing module determines to utilize a fixed value of zero when the operational function is an undo write response operation. As yet another example, the processing module determines to sum number of bytes of the payload to produce the value as a four byte payload length field when the operational function is a checked write request operation.

The method continues at step 146 where the processing module appends the payload to the protocol header to produce the DSN frame. The method continues at step 148 where the processing module outputs the DSN frame. For example, the processing module sends a request message DSN frame to one or more DS unit for a write request operation. As another example, the processing module sends a response message DSN to a requesting device that initiated a write request.

The method continues at step 150 where the processing module establishes a value for the payload length field as a predetermined value. For example, processing module establishes the value as zero for the payload field when the DSN frame is not to have a payload. The method continues at step 152 where the processing module establishes the protocol header as the DSN frame. The method continues at step 148 where the processing module outputs the DSN frame.

Figure 7B:
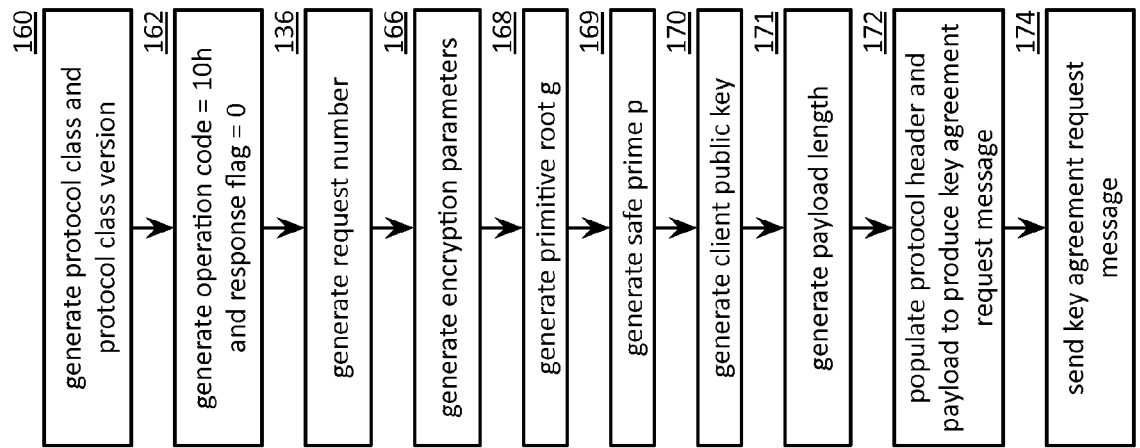
FIG. 7B is a flowchart illustrating an example of generating a read request message in accordance with the present invention.
Figure 7A:
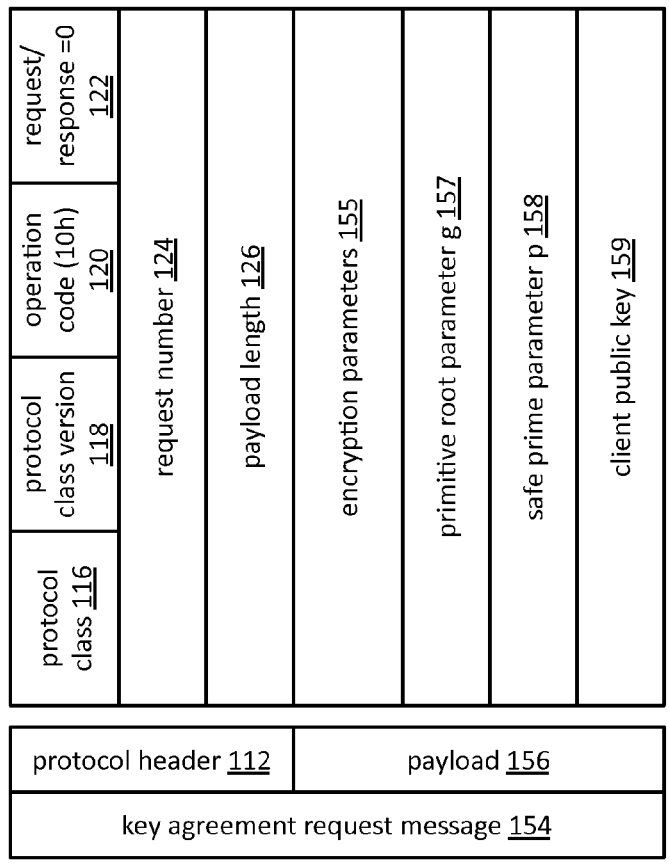
FIG. 7A is a diagram illustrating an example of a read request message format in accordance with the present invention.

FIG. 7A is a diagram illustrating an example of a key agreement request message format as a request dispersed storage network (DSN) frame that includes a protocol header 112 and a payload 156. The protocol header 112 includes one or more of a protocol class field 116, a protocol class version field 118, an operation code field 120, a request/response field 122, a request number field 124, and a payload length field 126. For example, the protocol class field 116 includes a protocol class value of 03 hex, the protocol class version field 118 includes a protocol class version value of 01 hex, the operation code field 120 includes an operation code value of 10 hex, and the request/response field 122 includes a value of zero when the request DSN frame is associated with a key agreement request operational function.

The payload 156 includes an encryption parameters field 155, a primitive root parameter g field 157, a safe prime parameter p field 158, and a client public key field 159. The encryption parameters field 155 includes encryption parameter values (e.g., encryption algorithm indicators such as advanced encryption standard AES-256-CBC) and may be variable in length (e.g., any number bytes). The primitive root parameter g field 157 includes a primitive root g value of a Diffie-Hellman function. The safe prime parameter p field 158 includes a safe prime parameter p value of a Diffie-Hellman function. The client public key field 159 includes a client public key value (e.g., of a public-private key pair associated with a key agreement request sending entity). As an implementation example, the primitive root parameter g field 157, the safe prime parameter p field 158, and the client public key field 159 are each four bytes in length.

FIG. 7B is a flowchart illustrating an example of generating a key agreement request message for a request dispersed storage network (DSN) frame to support a key agreement request operation. The method begins at step 160 where a processing module generates values for fields of a protocol header. The generating includes similar steps to steps 128-130 of FIG. 6D where the processing module generates a protocol class value for a protocol class field and generates a protocol class version value for a protocol class version field. The generation of the fields of the protocol header includes generating the protocol class field to indicate a protocol class for the key agreement request operation and generating the protocol class version field to indicate a protocol class version for the key agreement request operation.

The method continues at step 162, which includes similar steps to steps 132-134 of FIG. 6D, where the processing module generates an operation code field to indicate a key agreement request operation (e.g., an operation code value of 10 hex) and generates a request/response value of zero for a request/response field. The method continues at step 136 of FIG. 6D where the processing module determines a request number value for a request number field.

The method continues at step 166 where the processing module generates encryption parameters of a payload section of the key agreement request DSN frame. The generating includes one or more of determining new encryption parameters associated with the key agreement request, obtaining the encryption parameters from one or more of a lookup, a query, a local memory retrieval, a DSN access, and a message.

The method continues at step 168 where the processing module generates a primitive root parameter g value. The generating includes one or more of determining the primitive root parameter g value associated with the key agreement request based on a Diffie-Hellman function, obtaining the primitive root parameter g value from one or more of a lookup, a query, a local memory retrieval, a DSN access, and a message.

The method continues at step 169 where the processing module generates a safe prime premature p value. The generating includes one or more of determining the safe prime premature p value associated with the key agreement request based on the Diffie-Hellman function, obtaining the safe prime premature p value from one or more of a lookup, a query, a local memory retrieval, a DSN access, and a message.

The method continues at step 170 where the processing module generates a client public key value. The generating includes one or more of generating the client public key value as a public key of a public-private key pair, obtaining the public key value from one or more of a lookup, a query, a local memory retrieval, a DSN access, and a message.

The method continues at step 171 where the processing module generates a payload length field of the protocol header to include a payload length that represents a length of the payload section. The generating of the payload length includes determining a length of each field of the payload section. For example, the generating includes determining a length of an encryption parameters field, determining a length of a primitive root parameter g field, determining a length of a safe prime parameter p field, and determining a length of a client public key field. For example, the processing adds 12 (e.g., four bytes for each of the primitive root parameter g field, the safe prime parameter p field, and the client public key field) to a byte count of the encryption parameters value of the encryption parameters field to produce the payload length.

The method continues at step 172 where the processing module populates the protocol header and the payload section in accordance with a key agreement request message format to produce the key agreement request message. The method continues at step 174 where the processing module outputs the request DSN frame in order of the protocol header, the encryption parameters field, the primitive root parameter g field, the safe prime parameter p field, and the client public key field. Alternatively, or in addition to, the processing module generates a plurality of DSN frames regarding the key agreement request operation, wherein the plurality of DSN frames includes the request DSN frame.

Figure 8B:
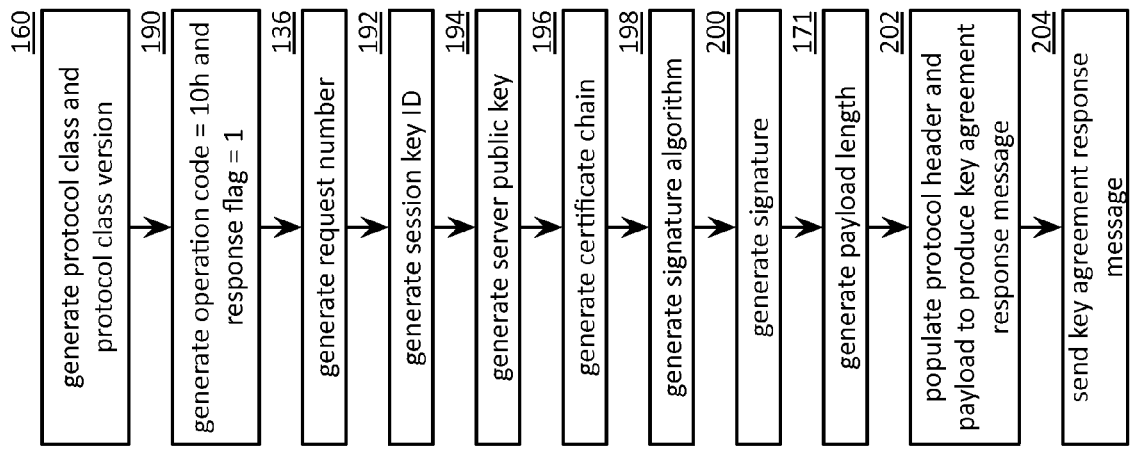
FIG. 8B is a flowchart illustrating an example of generating a read response message in accordance with the present invention.
Figure 8A:
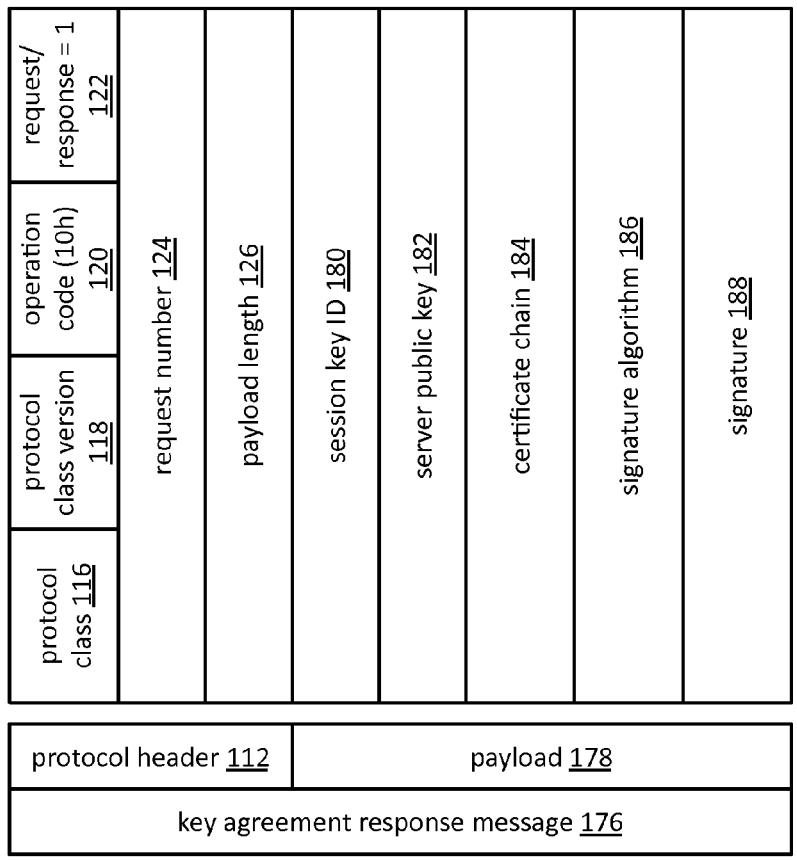
FIG. 8A is a diagram illustrating an example of a read response message format in accordance with the present invention.

FIG. 8A is a diagram illustrating an example of a key agreement response message 176 response dispersed storage network (DSN) frame that includes a protocol header 112 and a payload 178. The a protocol header 112 includes one or more of a protocol class field 116, a protocol class version field 118, an operation code field 120, a request/response field 122, a request number field 124, and a payload length field 126. For example, the protocol class field 116 includes a protocol class value of 03 hex, the protocol class version field 118 includes a protocol class version value of 01 hex, the operation code field 120 includes an operation code value of 10 hex, and the request/response field 122 includes a value of one when the response DSN frame is associated with a key agreement response operational function.

The payload 178 includes a session key identifier (ID) field 180, a server public key field 182, a certificate chain field 184, a signature algorithm field 186, and a signature field 188. The session key identifier (ID) field 180 includes a session key ID value, wherein the session key ID value is unique among other session key IDs generated by a key agreement response sending entity in response to receiving a key agreement request. The server public key field 182 includes a server public key value associated with the key agreement response sending entity. The certificate chain field 184 includes a certificate chain field value (e.g., one or more certificates corresponding to one or more certificate authorities in a chain from the key agreement response sending entity to a root certificate authority). The signature algorithm field 186 includes a signature algorithm value utilized to generate the signature. For example, the signature algorithm value may indicate secure hash algorithm 1 (SHA1) with Rivest Shamir Adleman (RSA). As another example, the signature algorithm value may indicate SHA1 with digital signature algorithm (DSA).

The signature field 188 includes a signature value generated, in accordance with the signature algorithm value, over the payload 178 and a payload of a corresponding key agreement request message. For example, such a signature value may be generated in accordance with distinguished encoding rules (DER) encoding of an abstract syntax notation 1 (ASN.1). In an implementation example, the session key identifier (ID) field 180 and the server public key field 182 are each four bytes in length and the certificate chain field 184, the signature algorithm field 186, and the signature field 188 include a variable number of bytes.

FIG. 8B is a flowchart illustrating an example of generating a key agreement response message for a response dispersed storage network (DSN) frame to support a key agreement response operation, which includes similar steps to FIGS. 6D and 7B. The method begins with step 160 of FIG. 7B where a processing module generates fields of a protocol header to include values of the fields of the protocol header. For example, generation of the fields of the protocol header includes generating the protocol class field to indicate a protocol class for a key agreement response operation and generating the protocol class version field to indicate a protocol class version for the key agreement response operation.

The method continues at step 190, which include similar steps to steps 132-134 of FIG. 6D, where the processing module generates an operation code field to indicate a key agreement response operation (e.g., an operation code value of 10 hex) and generates a request/response value of 1 for a request/response field. The method continues with step 136 of FIG. 6D where the processing module determines a request number value for a request number field by utilizing a request number value of a corresponding request DSN frame when the response DSN frame is in response to the corresponding request DSN frame.

The method continues at step 192 where the processing module generates a session key identifier (ID) of a payload section of the response DSN. The generating includes generating the session key ID such that the session key ID is unique among other previously generated session key IDs by a key agreement response sending entity (e.g., a server).

The method continues at step 194 where the processing module generates a server public key value. The generating includes one or more of generating the server public key value as a public key of a public-private key pair, obtaining the server public key value from one or more of a lookup, a query, a local memory retrieval, a DSN access, and a message.

The method continues at step 196 where the processing module generates a certificate chain value. The generating includes one or more of generating the certificate chain value based on sending at least one certificate signing request and receiving at least one signed certificate in response, and obtaining the certificate chain value based on one or more of a lookup, a query, a local memory retrieval, a DSN access, and a message. The generating includes ordering one or more certificates such that a certificate associated with the key agreement response sending entity (e.g., the server) is first, followed by each successive certificate from an issuer of a previous certificate.

The method continues at step 198 where the processing module generates a signature algorithm value. The generating includes obtaining the signature algorithm value based on one or more of a lookup, a query, a local memory retrieval, a DSN access, and a message. The method continues at step 200 where the processing module generates a signature value. The generating of the signature value includes utilizing a signature algorithm associated with the signature algorithm value to form a signature over the payload section of the key agreement response DSN frame and a payload of a corresponding key agreement request DSN frame.

The method continues with step 171 of FIG. 7B where the processing module generates a payload length field of the protocol header to include a payload length that represents a length of the payload section. The method continues at step 202 where the processing module populates the protocol header and the payload to produce the key agreement response message. The method continues at step 204 where the processing module outputs the key agreement response DSN frame in order of the protocol header, the session key ID field, the server public key field, the certificate chain field, the signature algorithm field, and the signature field.

Figure 9B:
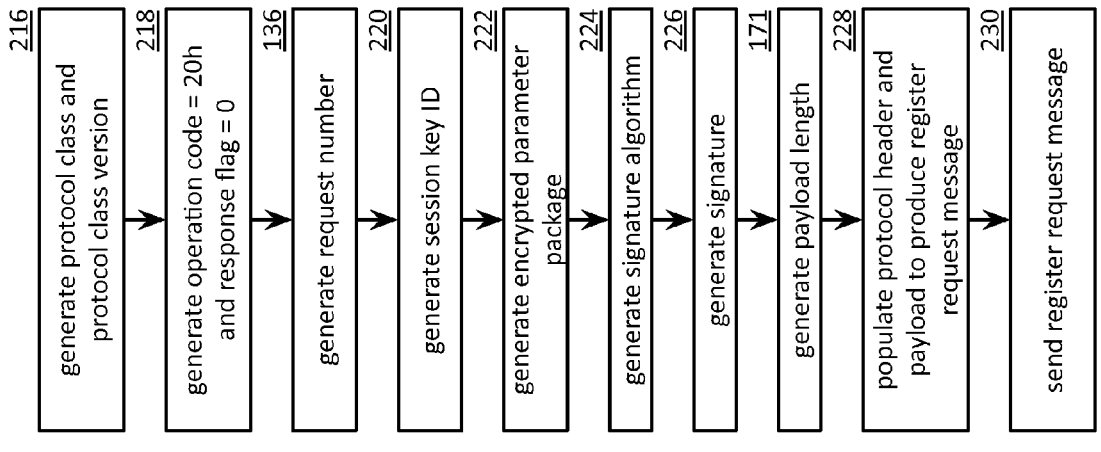
FIG. 9B is a flowchart illustrating an example of generating a register request message in accordance with the present invention.
Figure 9A:
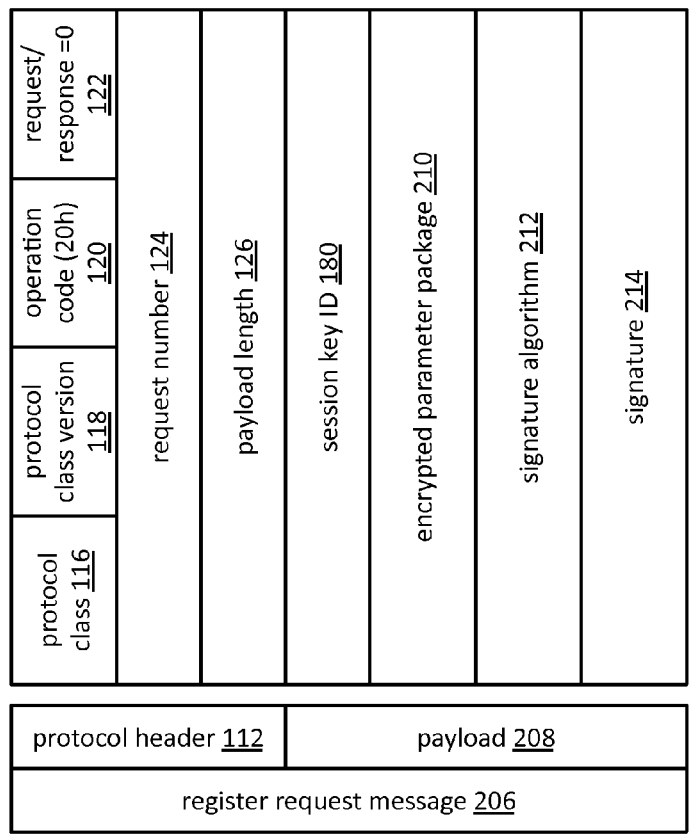
FIG. 9A is a diagram illustrating an example of a register request message format in accordance with the present invention.

FIG. 9A is a diagram illustrating an example of a register request message 206 request dispersed storage network (DSN) frame that includes a protocol header 112 and a payload 208. The protocol header 112 includes one or more of a protocol class field 116, a protocol class version field 118, an operation code field 120, a request/response field 122, a request number field 124, and a payload length field 126. For example, the protocol class field 116 includes a protocol class value of 03 hex, the protocol class version field 118 includes a protocol class version value of 01 hex, the operation code field 120 includes an operation code value of 20 hex, and the request/response field 122 includes a value of zero when the request DSN frame is associated with a register request operational function.

The payload 208 includes a session key identifier (ID) field 180, an encrypted parameter package field 210, a signature algorithm field 212, and a signature field 214. The session key identifier (ID) field 180 includes a session key ID value, wherein the session key ID value is extracted from a previously received key agreement response message. The encrypted parameter package field 210 includes one or more parameter values including at least one of an alias name, a certificate chain, a share index, a decode threshold, a share width, a share revision, an encrypted share, a secret exponent, and a nonce. The alias name includes a string representation of an alias for a key being stored and a certificate chain. The string representation may include a format of username@realm. The share index includes an index of a share of the key being stored. The decode threshold includes a number of shares required to reconstruct the share being stored. The share width includes a number of shares. The share revision includes a unique revision ID associated with a corresponding share. The encrypted share includes an encrypted secret share of the key being stored. The encryption includes encryption utilizing a strong key generated based on a user password and a secret exponent. The secret exponent includes a randomly chosen number between one and a hard-coded Sophie-Germain prime q. The nonce includes a hash (e.g., SHA-512) of a mutual secret appended with a constant (e.g., character "N"). The nonce may be utilized to prevent replay attacks as well as validating property coding.

The signature algorithm field 212 includes a signature algorithm value utilized to generate a signature value of the signature field. The signature field 214 includes a signature value generated, in accordance with the signature algorithm value, over the payload 208.

FIG. 9B is a flowchart illustrating an example of generating a register request message as a request dispersed storage network (DSN) frame to support a register request operation. The method begins at step 216 where a processing module generates values for fields of a protocol header to include one or more steps of steps 128-130 of FIG. 6D where the processing module generates a protocol class value for a protocol class field and generates a protocol class version value for a protocol class version field. The generating of the fields of the protocol header includes generating the protocol class field to indicate a protocol class for the register request operation and generating the protocol class version field to indicate a protocol class version for the register request operation.

The method continues at step 218 which includes one or more steps of steps 132-134 of FIG. 6D, where the processing module generates an operation code field to indicate a register request operation (e.g., an operation code value of 20 hex) and generates a request/response value of zero for a request/response field. The method continues with step 136 of FIG. 6D where the processing module determines a request number value for a request number field.

The method continues at step 220 where the processing module generates a session key identifier (ID) value of a payload section of the register request DSN frame. The generating includes obtaining the session key ID value from one or more of a lookup, a query, a local memory retrieval, a DSN access, and a message. For example, the processing module extracts the session key ID value from a previously received key agreement response message.

The method continues at step 222 where the processing module generates an encrypted parameter package to include one or more encrypted parameter package values. The generating may be based on one or more of determining at least one of the one or more encrypted parameter package values and obtaining at least one of the one or more encrypted parameter package values based on one or more of a lookup, a query, a local memory retrieval, a DSN access, and a message. For example, the processing module generates an encrypted share and a secret exponent as encrypted parameter package values and retrieves a share width encrypted parameter package value from local memory.

The method continues at step 224 where the processing module generates a signature algorithm value. The generating includes obtaining the signature algorithm value based on one or more of a lookup, a query, a local memory retrieval, a DSN access, and a message. The method continues at step 226 where the processing module generates a signature value. The generating of the signature value includes utilizing a signature algorithm associated with the signature algorithm value to form a signature over the payload section of the register request message.

The method continues with step 171 of FIG. 7B where the processing module generates a payload length field of the protocol header to include a payload length that represents a length of the payload section. The method continues at step 228 where the processing module populates the protocol header and the payload to produce the register request message. The method continues at step 230 where the processing module outputs the register request DSN frame in order of the protocol header, the session key ID field, the encrypted parameter package field, the signature algorithm field, and the signature field.

FIG. 10A is a diagram illustrating an example of a register response message 232 of a register response dispersed storage network (DSN) frame that includes a protocol header 112. The protocol header 112 includes one or more of a protocol class field 116, a protocol class version field 118, an operation code field 120, a request/response field 122, a request number field 124, and a payload length field 126. For example, the protocol class field 116 includes a protocol class value of 03 hex, the protocol class version field 118 includes a protocol class version value of 01 hex, the operation code field 120 includes an operation code value of 20 hex, the request/response field 122 includes a value of one, and the payload length field includes a value of zero when the response DSN frame is associated with a register response operational function. The register response DSN frame may be sent by a register response sending entity (e.g., a server) when a registration sequence is successful.

FIG. 10B is a flowchart illustrating an example of generating a register response message of a response dispersed storage network (DSN) frame to support a register response operation. The method may be executed by a processing module (e.g., of a server) when the processing module determines that a registration sequence is successful. The determination may be based on one or more of verifying that a register request is associated with an authenticated user, verifying an associated certificate chain, verifying that a session key identifier (ID) is associated with a key agreement response, verifying that an associated alias name is not already in use, validating a signature, validating that an associated secret exponent is within a valid range, and validating that an associated encrypted share is within a valid range.

The method to generate the register response message begins at step 216 of FIG. 9B where the processing module generates values for fields of a protocol header. The generation of the fields of the protocol header includes generating a protocol class field to indicate a protocol class for the register response operation and generating a protocol class version field to indicate a protocol class version for the register response operation.

The method continues at step 234 where the processing module generates an operation code field to indicate a register request operation (e.g., an operation code value of 20 hex) and generates a request/response value of one for a request/response field. The method continues with step 136 of FIG. 6D where the processing module determines a request number value for a request number field. For example, the processing module determines the request number value to be a request number value of a corresponding received register request message.

The method continues with step 171 of FIG. 7B where the processing module generates a payload length field of the protocol header to include a payload length of zero (e.g., no payload section). The method continues at step 236 where the processing module populates the protocol header to produce the register response message. The method continues at step 238 where the processing module outputs the register response DSN frame that includes the protocol header.

Figure 11A:
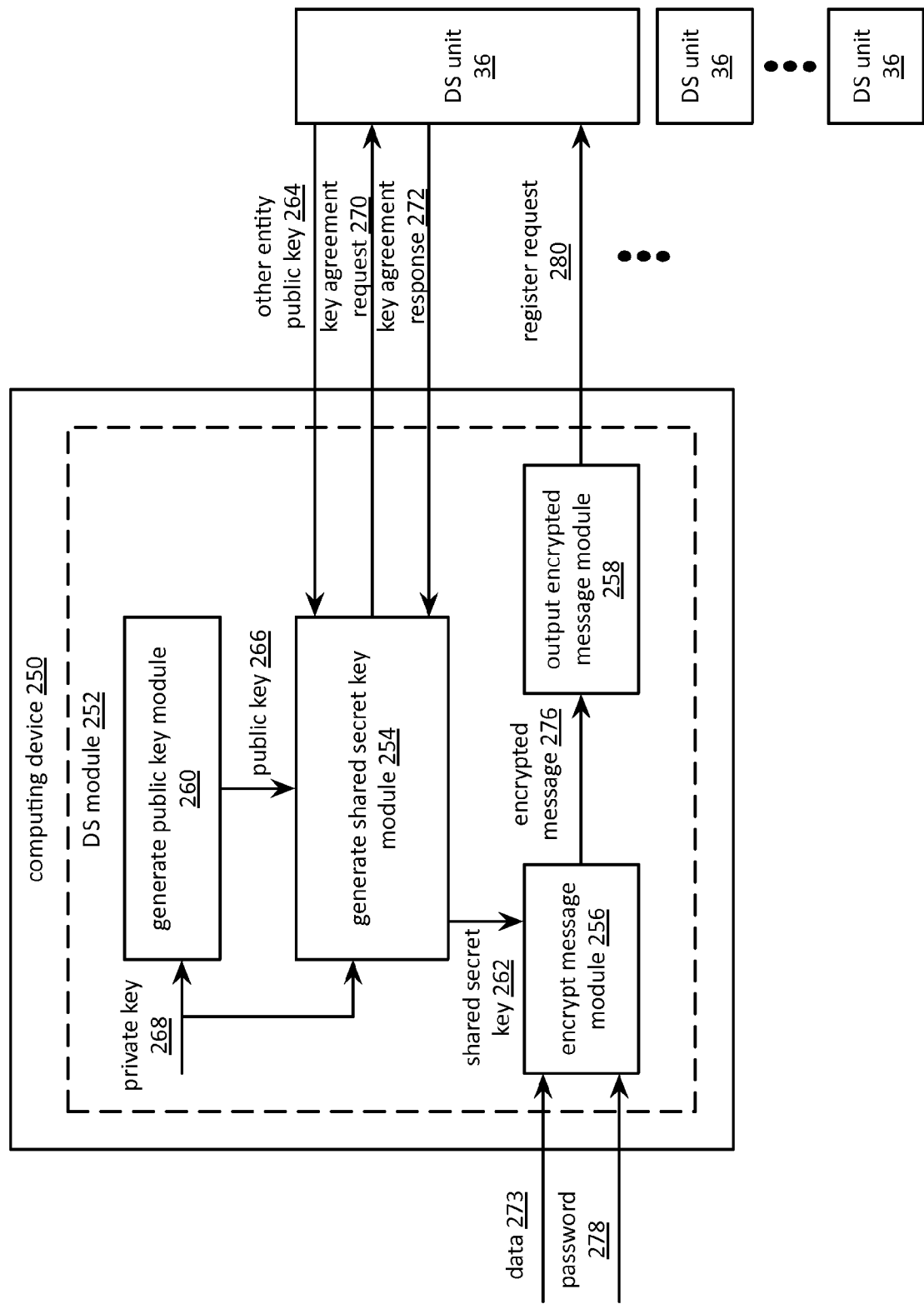
FIG. 11A is a schematic block diagram of another embodiment of a computing system in accordance with the present invention.

FIG. 11A is a schematic block diagram of another embodiment of a computing system that includes a computing device 250 and one or more dispersed storage (DS) units 36. The computing device 250 may be implemented as at least one of a user device, a DS processing unit, a DS unit, a DS managing unit, and any other computing device operable to couple with the one or more DS units 36. Each DS unit 36 of the one or more DS units may be implemented as at least one of a server, a storage device, a user device, a DS processing unit, a DS unit, a DS managing unit, and any other computing device. The computing device 250 includes a DS module 252. The DS module 252 includes a generate shared secret key module 254, an encrypt message module 256, an output encrypted message module 258, and a generate public key module 260.

The generate shared secret key module 254, when operable within the computing device 250, causes the computing device 250 to generate a shared secret key 262 from a public key 264 of another entity (e.g., a DS unit 36) and a private key 268 using a first modulo prime polynomial function, wherein a public key 266 is generated from the private key 268 using a second modulo prime polynomial function and wherein the public key 264 of the other entity is derived using the second modulo prime polynomial function on a private key of the other entity. The generate shared secret module 254 functions to generate the shared secret key by obtaining a prime "p" and generating the shared secret key 262 as a modulo "p" of the public key 264 of the other entity raised to a power of the private key 268. The generating may further include truncating the result of the second modulo prime polynomial function such that the shared secret key 262 includes a desired number of bits.

The generate shared secret module 254 further functions to generate the shared secret key 262 by obtaining the prime "p", obtaining a constant "K" (e.g., retrieved, an alpha character K, generated and shared with the other entity for a session), generating a shared secret as a modulo "p" of the public key 264 of the other entity raised to a power of the private key 268 (e.g., shared secret=other entity public key (264) ^ private key (268) modulo p), and generating the shared secret key 262 based on the constant K and the shared secret. For example, a hashing function is utilized to generate a hash digest of the shared secret and an exclusive OR function is performed on the hash digest and the constant K such that the shared secret key 262 includes the desired number of bits. The shared secret key 262 may include two or more shared secret keys based on the shared secret by generating each of the two more shared secret keys based on the shared secret and a unique constant associated with each of the shared secret keys. For example, the hashing function is utilized to generate the hash digest of the shared secret and an exclusive OR function is performed on the hash digest and the constant T to produce a second shared secret key that includes the desired number of bits. The two or more shared secret keys may be utilized within the computing system to send confidential information from one entity to another. For example, a first shared secret key may be utilized to send confidential information from the computing device 250 to the DS unit 36. As another example, a second shared secret key may be utilized to send confidential permission from the DS unit 36 to the computing device 250. In such examples, the constants may be predetermined and known in advance by both entities.

The generate shared secret key module 254 further functions to generate the shared secret key 262 by outputting a key agreement request 270 to the other entity, wherein the key agreement request 270 includes a primitive root polynomial "g", the prime "p", and the public key 266 (e.g., public key of the DS module) and receiving a key agreement response 272 from the other entity, wherein the key agreement response includes the public key 264 of the other entity and authentication information. The outputting includes generating the key agreement request 270, wherein generating the key agreement request 270 includes generating the key agreement request 270 to include a header section and a payload section, wherein the payload section includes encryption parameters (e.g., an encryption algorithm such as AES-256-CBC, the primitive root polynomial "g", the prime "p", and the public key 266). The authentication information includes one or more of a certificate chain, a signature algorithm, and a signature.

The encrypt message module 256, when operable within the computing device 250, causes the computing device 250 to encrypt a message 274 using the shared secret key to produce an encrypted message 276. The encrypt message module 256 functions to encrypt the message 274 by encoding the data 273 in accordance with an encoding function to produce a set of encoded shares. The data 273 includes one or more of an encryption key, a credential, access information, a document, a file, an identifier, address information, and confidential information. For each encoded share of at least a write threshold number of encoded shares of the set of encoded shares (e.g., greater than or equal to a decode threshold number with regards to the encoding function), the encrypt message module 256 further functions to generate an encryption key based on a random number affiliated with the other entity (e.g., sent to the other entity as a secret exponent) and a prime "p", encrypt the encoded share utilizing the encryption key to produce an encrypted share, and generate the message 274 as a parameter package that includes the encrypted share and the secret exponent.

The encoding function includes at least one of a Shamir function and dispersed storage error encoding function. The generating of the encryption key includes generating the secret exponent (e.g., a random number generated and shared with the other entity) and generating the encryption key based on a password 278 (e.g., input from a user, retrieved) and the secret exponent. For example, the encryption key is generated by transforming the password 278 utilizing a mask generating function (MGF) in accordance with a formula of: encryption key=$((MGF(password))^2)^{ex}$ modulo p; where ex is the secret exponent and p may be prime p. The parameter package may also include a nonce (e.g., hash of shared secret XOR with a constant N), a share revision, a share width, a decode threshold, a share index, a certificate chain, and an alias name for the message.

The output encrypted message module 258, when operable within the computing device 250, causes the computing device 250 to output the encrypted message 276 to the other entity. The outputting the encrypted message 276 to the other entity includes generating a register request 280, wherein generating the register request 280 includes one or more of obtaining (e.g., generate, retrieve, receive) a certificate chain, (e.g., chain to a certificate authority), obtaining (e.g., retrieve, receive) a signature algorithm (e.g., a signature algorithm type), generating a signature, (e.g., over other portions of a payload section of the register request), and generating the register request 280 to include a header section and a payload section, wherein the payload section includes a session key identifier (e.g., from the key agreement response 272), the encrypted message 276, the certificate chain, the signature algorithm, and the signature.

The generate public key module 260, when operable within the computing device 250, causes the computing device 250 to generate the public key 266 by generating a primitive root polynomial "g", generating a prime "p", and generating the public key as a modulo "p" of "g" raised to a power of the private key 268. The primitive root polynomial g and the prime p are related such that every number "a" between 1 and (p−1), there is some integer exponent (e) such that g^e mod p=a. For example, public key (266)=g^ private key (268) modulo p, wherein the private key 268 is generated as a random number.

Figure 11B:
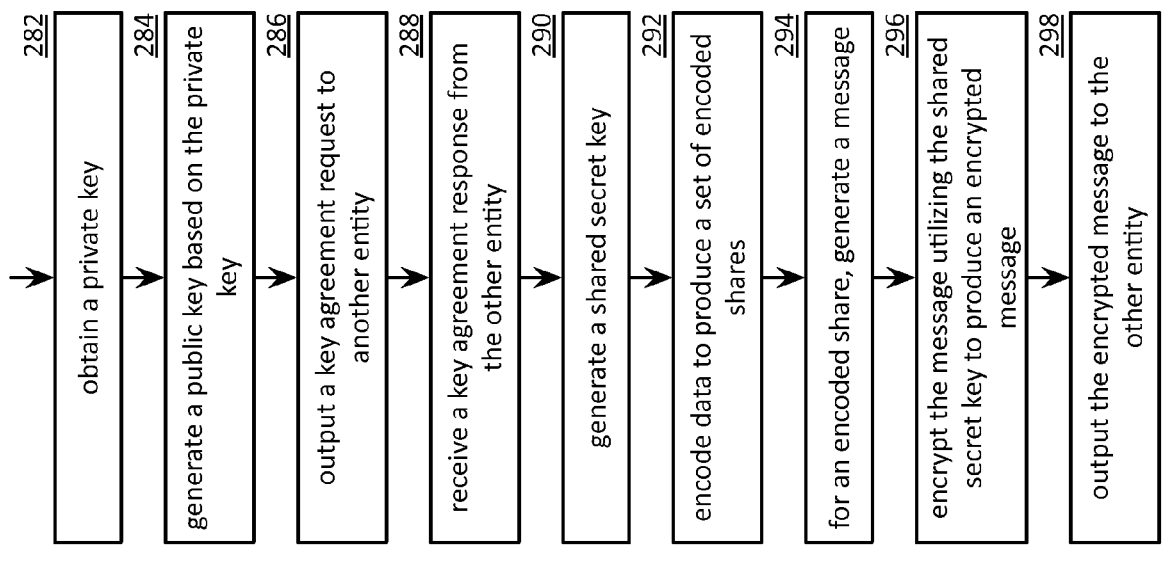
FIG. 11B is a flowchart illustrating an example of encrypting a message in accordance with the present invention.

FIG. 11B is a flowchart illustrating an example of encrypting a message. The method begins at step 282 where a processing module (e.g., of a distributed storage (DS) module, a user device, a DS processing unit) obtains a private key. The obtaining includes at least one of retrieving the private key, generating the private key based on a random number, and receiving the private key. Such a private key may be associated with the DS module. The method continues at step 284 where the processing module generates a public key based on the private key, wherein the public key is generated from the private key using a second modulo prime polynomial function. The generating the public key includes generating a primitive root polynomial "g", generating a prime "p", and generating the public key as a modulo "p" of "g" raised to a power of the private key (e.g., public key=g ^ private key modulo p). The primitive root polynomial g and the prime p are related such that every number "a" between 1 and (p−1), there is some integer exponent (e) such that g^e mod p=a.

The method continues at step 286 where the processing module outputs a key agreement request to another entity (e.g., a DS unit, an authentication server, a storage server), wherein the key agreement request includes the primitive root polynomial "g", the prime "p", and the public key. The outputting includes generating the key agreement request, wherein generating the key agreement request includes generating the key agreement request to include a header section and a payload section, wherein the payload section includes encryption parameters (e.g., an encryption algorithm such as AES-256-CBC), the primitive root polynomial "g", the prime "p", and the public key.

The method continues at step 288 where the processing module receives a key agreement response from the other entity, wherein the key agreement response includes a public key of the other entity and authentication information. The authentication information includes one or more of a certificate chain, a signature algorithm, and a signature over the response. The method continues at step 290 where the processing module generates a shared secret key from the public key of another entity and the private key using a first modulo prime polynomial function, wherein the public key of the other entity is derived using the second modulo prime polynomial function on a private key of the other entity.

The generating the shared secret key includes obtaining the prime "p" and generating the shared secret key as a modulo "p" of the public key of the other entity raised to a power of the private key (e.g., shared secret key=(public key of the other entity) ^ private key modulo p). The generating may further include truncating the result of the second modulo prime polynomial function such that the shared secret key includes a desired number of bits. The generating the shared secret key further includes obtaining the prime "p", obtaining a constant "K" (e.g., retrieved, generated and shared with the other entity), generating a shared secret as a modulo "p" of the public key of the other entity raised to a power of the private key, and generating the shared secret key based on the constant K and the shared secret. For example, a hashing function is utilized to generate a hash digest of the shared secret and an exclusive OR function is performed on the hash digest and the constant K such that the shared secret key includes the desired number of bits.

The method continues at step 292 where the processing module encodes data in accordance with an encoding function (e.g., Shamir function or dispersed storage error encoding function) to produce a set of encoded shares. The data includes one or more of an encryption key, a credential, access information, a document, a file, an identifier, address information, and confidential information.

For an encoded share of the set of encoded shares, the method continues at step 294 where the processing module generates a message. The generating the message includes generating an encryption key based on a random number affiliated with the other entity (e.g., the secret exponent generated based on a random number and shared with the other entity) and the prime "p", encrypting the encoded share utilizing the encryption key to produce an encrypted share, and generating the message as a parameter package that includes the encrypted share and a secret exponent. The generating of the encryption key includes generating the secret exponent (e.g., based on a random number) and generating the encryption key based on a password (e.g., input from a user, retrieved) and the secret exponent. For example, the encryption key is generated by transforming the password utilizing a mask generating function (MGF) in accordance with a formula of: encryption key=$((MGF(password))^2)^{ex}$ modulo p; where ex is the secret exponent and p may or may not be prime p (e.g., a different unique value of p). The parameter package may also include a nonce (e.g., hash of shared secret XOR with a constant N), a share revision, a share width, a decode threshold, a share index, a certificate chain, and an alias name for the message.

The method continues at step 296 where the processing module encrypts the message using the shared secret key to produce an encrypted message. The method continues at step 298 where the processing module outputs the encrypted message to the other entity. The outputting the encrypted message to the other entity includes generating a register request, wherein generating the register request includes one or more of obtaining (e.g., generate, retrieve, receive) a certificate chain, (e.g., chain to a certificate authority), obtaining (e.g., retrieve, receive) a signature algorithm (e.g., a signature algorithm type), generating a signature, (e.g., over other portions of a payload section of the register request), and generating the register request to include a header section and a payload section, wherein the payload section includes a session key identifier (e.g., from an associated key agreement response), the encrypted message, the certificate chain, the signature algorithm, and the signature.

Figure 11C:
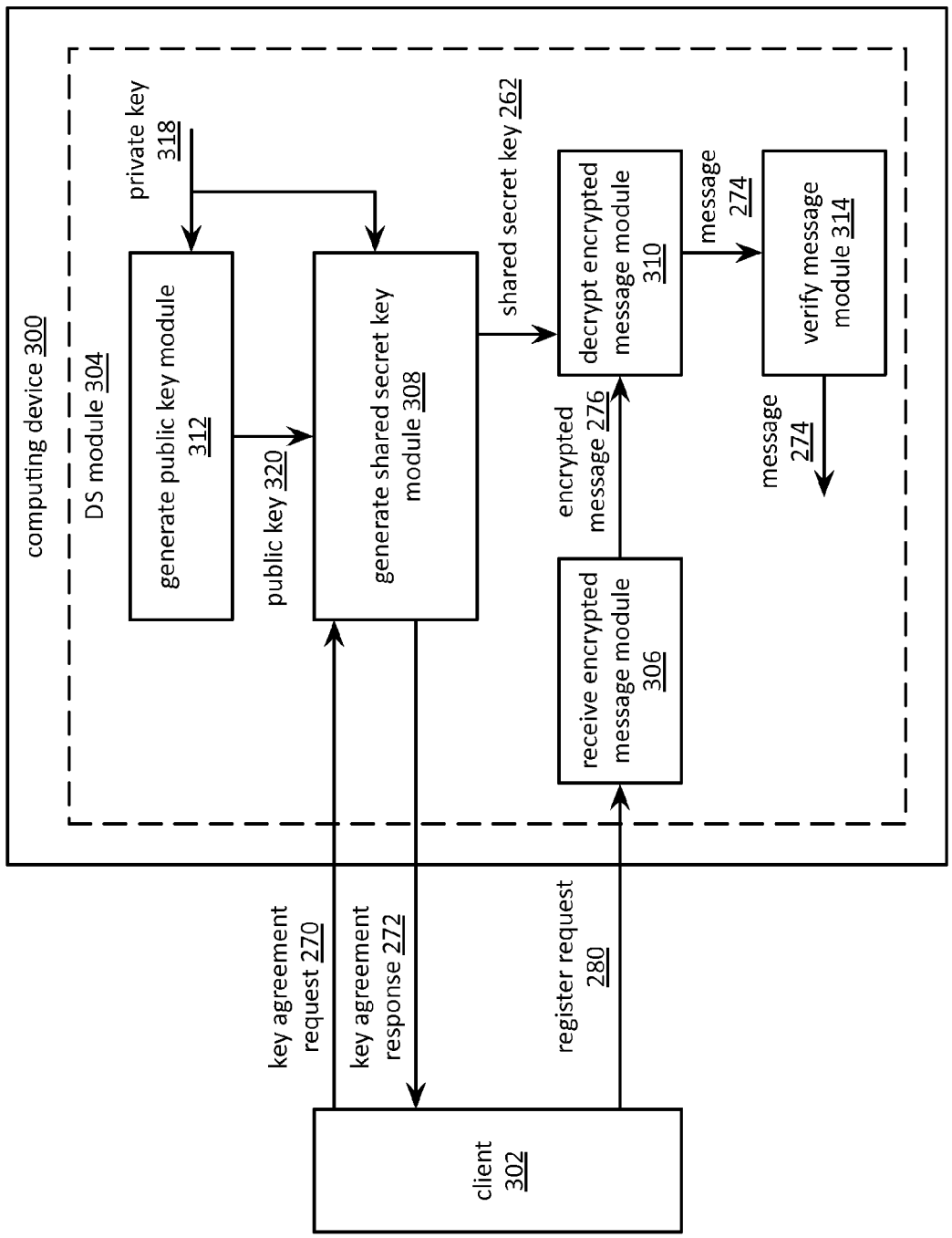
FIG. 11C is a schematic block diagram of another embodiment of a computing system in accordance with the present invention.

FIG. 11C is a schematic block diagram of another embodiment of a computing system that includes a computing device 300 and a client 302. The client 302 may be implemented as at least one of a user device, a DS processing unit, a DS unit, a DS managing unit, and any other computing device operable to couple with the computing device 300. The computing device 300 may be implemented as at least one of a server, a storage device, an authentication server, a user device, a DS processing unit, a DS unit, a DS managing unit, and any other computing device. The computing device 300 includes a DS module 304. The DS module 304 includes a receive encrypted message module 306, a generate shared secret key module 308, a decrypt encrypted message module 310, a generate public key module 312, and a verify message module 314.

The receive encrypted message module 306, when operable within the computing device 300, causes the computing device 300 to receive an encrypted message 276 from another entity (e.g., the client 302). The receive encrypted message module 306 may receive a register request 280 from the client 302 that includes the encrypted message 276 and a signature over at least a portion of the register request 280.

The generate shared secret key module 308, when operable within the computing device 300, causes the computing device 300 to generate a shared secret key 262 from a public key 320 of the other entity and a private key 318 using a first modulo prime polynomial function, wherein a public key 320 is generated from the private key 318 using a second modulo prime polynomial function and wherein the public key 320 of the other entity is derived using the second modulo prime polynomial function on a private key of the other entity. The private key 318 may be obtained by at least one of retrieving the private key 318, receiving the private key 318, and generating the private key 318 based on a random number. The generate shared secret key module 308 functions to generate the shared secret key by obtaining a prime "p" and generating the shared secret key 262 as a modulo "p" of the public key 320 of the other entity raised to a power of the private key 318 (e.g., shared secret key 262=public key (320) ^ private key (318) modulo p). The generate shared secret key module 308 may obtain the prime p and the public key 320 of the other entity by receiving a key agreement request 270 that includes one or more of the prime p, the public key 316 of the other entity, and a primitive root polynomial "g".

The generate shared secret key module 308 further functions to generate the shared secret key 262 by obtaining the prime "p", obtaining a constant "K" (e.g., retrieve, receive), generating a shared secret as a modulo "p" of the public key of the other entity raised to a power of the private key, and generating the shared secret key 262 based on the constant K and the shared secret. For example, a hashing function is utilized to generate a hash digest of the shared secret and an exclusive OR function is performed on the hash digest and the constant K such that the shared secret key 262 includes a desired number of bits.

The decrypt encrypted message module 310, when operable within the computing device 300, causes the computing device 300 to decrypt the encrypted message 276 using the shared secret key 262 to recapture a message 274. The generate public key module 312, when operable within the computing device 300, causes the computing device 300 to generate the public key 320 by obtaining the primitive root polynomial "g", obtaining the prime "p", and generating the public key 320 as a modulo "p" of "g" raised to a power of the private key 318 (e.g., public key (320)=g ^ private key (318) modulo p). The generate shared secret key module 308 further functions to generate a key agreement response 272 and send the key agreement response 272 to the other entity. The key agreement response 272 includes the public key 320.

The verify message module 314, when operable within the computing device 300, causes the computing device 300 to verify the message 274 and when the message 274 is verified, store at least a portion of the message. For example, the verify message module 314 stores an encrypted share and a secret exponent of the message 274. The verifying includes validating the signature over at least a portion of the register request 280. For example, the verify message module 314 indicates that the message 274 is verified when a calculated hash of the at least the portion of the register request 280 is substantially the same as a decrypted signature utilizing the public key 320 of the other entity.

Figure 11D:
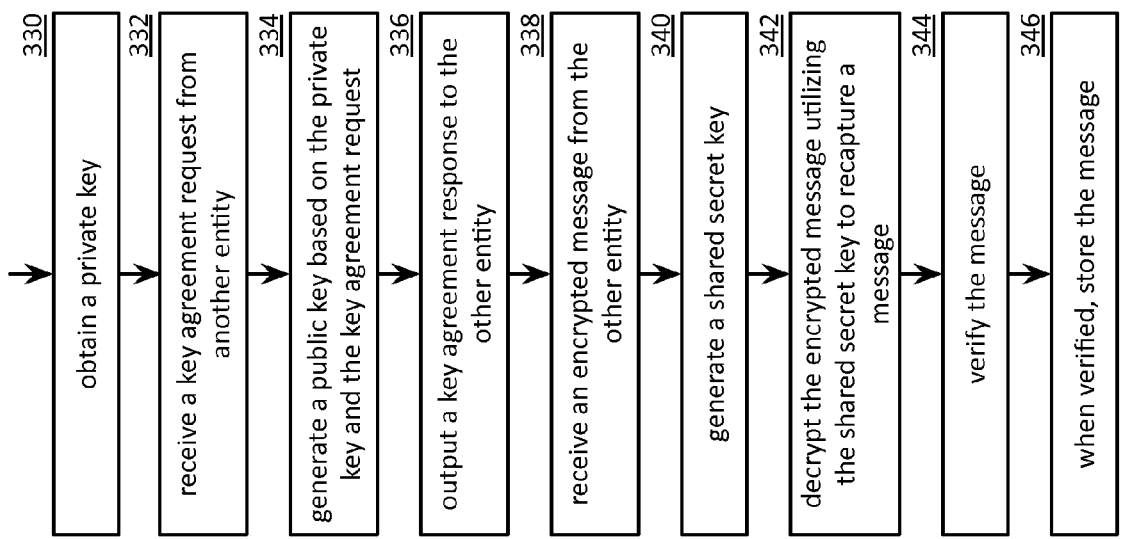
FIG. 11D is a flowchart illustrating an example of decrypting an encrypted message in accordance with the present invention.

FIG. 11D is a flowchart illustrating an example of decrypting an encrypted message. The method begins at step 330 where a processing module (e.g., of a dispersed storage (DS) module, a server) obtains a private key. The obtaining includes at least one of retrieving the private key, generating the private key based on a random number, and receiving the private key. Such a private key may be associated with the DS module. The method continues at step 332 where the processing module receives a key agreement request from another entity (e.g., a client). The key agreement request may include one or more of a primitive root polynomial "g", a prime "p", and a public key of the other entity.

The method continues at step 334 where the processing module generates a public key based on the private key, wherein the public key is generated from the private key using a second modulo prime polynomial function. The generating the public key includes obtaining the primitive root polynomial "g", obtaining the prime "p", and generating the public key as a modulo "p" of "g" raised to a power of the private key (e.g., public key=g ^ private key modulo p). The obtaining the primitive root polynomial g and the obtaining the prime p includes extracting the primitive root polynomial g and the obtaining the prime p from the key agreement request.

The method continues at step 336 where the processing module outputs a key agreement response to the other entity. The outputting includes generating the key agreement response to include the public key and sending the key agreement response to the other entity. The method continues at step 338 where the processing module receives an encrypted message from the other entity. The receiving may include receiving a register request from the other entity, wherein the register request includes at least one of the encrypted message and a signature over at least a portion of the register request.

The method continues at step 340 where the processing module generates a shared secret key from the public key of the other entity and the private key using a first modulo prime polynomial function, wherein the public key of the other entity is derived using the second modulo prime polynomial function on a private key of the other entity. The generating the shared secret key includes obtaining the prime "p", and generating the shared secret key as a modulo "p" of the public key of the other entity raised to a power of the private key (e.g., shared secret key=(public key of the other entity)^ private key modulo p). The generating the shared secret key further includes obtaining the prime "p", obtaining a constant "K" (e.g., received from the other entity, retrieved), generating a shared secret as a modulo "p" of the public key of the other entity raised to a power of the private key (e.g., shared secret=(public key of the other entity)^ private key modulo p), and generating the shared secret key based on the constant K and the shared secret. For example, a hashing function is utilized to generate a hash digest of the shared secret and an exclusive OR function is performed on the hash digest and the constant K such that the shared secret key includes a desired number of bits.

The method continues at step 342 where the processing module decrypts the encrypted message using the shared secret key to recapture a message. The method continues at step 344 where the processing module verifies the message. For example, the processing module indicates that the message is verified when a calculated hash of the at least the portion of the register request is substantially the same as a decrypted signature (e.g., of the register request) utilizing the public key of the other entity. When verified, the method continues at step 346 where the processing module stores at least a portion of the message. For example, the processing module stores an encrypted share and a corresponding secret exponent of the message.

FIG. 11E is a flowchart illustrating an example of storing a key. The method begins at step 350 where a processing module (e.g., of a dispersed storage (DS) processing module, a client) receives a set key request from a requester (e.g., from a user device). The set key request may be utilized by the requester to store a key. The set key request may include an alias name, a password, the key, and a certificate authority chain. The method continues at step 352 where the processing module generates a key agreement request message for each server of a set of servers (e.g., a set of dispersed storage (DS) units). The key agreement request message includes encryption parameters, a primitive root g, a safe prime p, and a client public key. The processing module generates the client public key based on a client private key and in accordance with client public key=$g^{client\ private\ key}$ modulo p. The method continues at step 354 where the processing module sends a corresponding key agreement request message to each server of the set of servers. The method continues at step 356 where the processing module receives a set of key agreement response messages from the set of servers.

The method continues at step 358 where the processing module determines a shared secret for each server based on a server public key and in accordance with an expression of: shared secret=server public key$^{client\ private\ key}$ modulo p. The method continues at step 360 where the processing module determines a session key for each server in accordance with an expression of: session key=hash of (shared secret exclusive OR "K"). For example, the processing module generates each session key utilizing a most significant 256 bits of a hash result when utilizing a SHA512 hash function.

The method continues at step 362 where the processing module generates a set of secret exponents, wherein each secret exponent of the set of secret exponents corresponds to a server. The generating includes generating the secret exponent as a random number. The method continues at step 364 where the processing module generates a set of encrypted shares. The generating includes applying a share encoding function to the key to produce a set of encoded shares, generating a set of strong keys utilizing a masked generating function (MGF) in accordance with an expression: strong key x=$((MGF(password))^2)^e{}_x$ modulo p (e is a corresponding secret exponent, x is a share number, password is retrieved or received), encrypting each encoded share of the set of encoded shares utilizing a corresponding strong key of the set of strong keys to produce the set of encrypted shares. The MGF produces a deterministic pattern of bits of any desired length based on an input. For example, the processing module generates strong key 1=$((MGF(password))^2)^e{}_1$ modulo p. For instance, the processing module generates strong key 1=13 when MGF(password)=4, $e_1$=10, and p=23, as $(4^2)^{10}$ mod 23=13. Alternatively, or in addition to, the processing module may further process the key to provide a key of a desired length in relation to an encryption algorithm. For example, the key output of the algorithm is hashed to produce a hashed key and a desired number of bits (e.g., 256, 192, 128 bits) of the hashed key are utilized as a key for the encryption algorithm.

The method continues at step 366 where the processing module generates a set of parameter packages, wherein each parameter package of the set of parameter packages corresponds to a server of the set of servers. The parameter package includes a corresponding encrypted share of the set of encrypted shares and a corresponding secret exponent of a set of secret exponents utilized to generate the set of strong keys. The method continues at step 368 where the processing module encrypts each parameter package of the set of parameter packages utilizing a corresponding session key of the set of session keys. The method continues at step 370 where the processing module generates a set of register request messages, wherein each register request message includes an associated session key ID, encrypted parameter package, signature algorithm, and signature. The method continues at step 372 where the processing module outputs the set of register request messages to the set of servers.

FIG. 11F is a flowchart illustrating an example of storing an encrypted key share. The method begins at step 374 where a processing module (e.g., of a server, of a dispersed storage (DS) unit) receives a key agreement request message from a requesting entity (e.g., a DS processing unit, a DS processing module, a user device, a client). The method continues at step 376 where the processing module generates a key agreement response message. The key agreement response message includes one or more of a session key identifier (ID), a server public key generated by the processing module based on a server private key and in accordance with server public key=$g^{server\ private\ key}$ modulo p, a server certificate chain, a signature algorithm, and a signature (e.g. over the key agreement request and/or the key agreement response). The method continues at step 378 where the processing module outputs the key agreement response message to the requesting entity.

The method continues at step 380 where the processing module determines a shared secret based on the server private key and a client public key from the key agreement request and in accordance with an expression: shared secret=client public key$^{server\ private\ key}$ modulo p. The method continues with step 382 where the processing module determines a session key in accordance with an expression of: session key=hash of (shared secret exclusive OR constant "K"). The method continues with step 384 where the processing module receives a register request message (e.g., from the requesting entity). The method continues at step 386 where the processing module verifies a signature of the register request message (e.g., validating that a hash of the request is substantially the same as a decrypted signature utilizing the client public key).

The method continues at step 388 where the processing module decrypts, utilizing the session key, an encrypted parameter package of the register request message to produce a parameter package. The method continues at step 390 where the processing module verifies a nonce of the parameter package. The verifying includes extracting the nonce from the parameter package, generating a hash of the shared secret plus a constant (e.g., character "N") to produce a hash value, and comparing the nonce to the hash value.

The processing module indicates that the nonce is verified when the comparison indicates that the nonce and the hash value are substantially the same. The method continues at step 392 where the processing module stores at least some of the parameter package when the nonce is verified. For example, the processing module stores a secret exponent and an encrypted share of the parameter package in a local memory for subsequent retrieval.

FIG. 12A is a flowchart illustrating example of retrieving a key. The method begins with step 394 where a processing module (e.g., of a dispersed storage processing module, a client) receives a get key request from a requester (e.g., from a user device). The get key request may be utilized by the requester to retrieve a key stored as a set of encrypted key shares in a set of servers. The get key request may include an alias name, a password, and a certificate authority chain. The method continues at step 396 where the processing module transforms the password into a set of n blinded passwords in accordance with an expression: blinded password $x=((MGF(password))^2)^b_x$ modulo p, for x=1 to n.

The method continues at step 398 where the processing module sends a set of n encrypted key share recovery messages to a set of n servers. The encrypted key share recovery message includes one or more of the alias name and a blinded password of the set of blinded passwords corresponding to the server. The method continues at step 400 where the processing module receives a decode threshold number of encrypted key share recovery response messages of a same share revision. The key share recovery message includes one or more of an encrypted key share, a blinded key in accordance with an expression: blinded key $x=$(blinded password $x)^e_x$ modulo p (e.g., wherein e is a secret exponent), a share index, a decode threshold, a share width, a share revision, a client certificate chain, a challenge identifier (ID), a client challenge, a server certificate chain, a signature algorithm, and a signature. The method continues at step 402 where the processing module verifies the signature.

The method continues at step 404 where the processing module transforms at least a decode threshold number of blinded keys into at least a decode threshold number of keys in accordance with an expression: key $x=$(blinded key $x)^v_x$ modulo p, wherein values of v are generated in accordance with b*v modulo q=1 (e.g., a security parameter constant q may be based on a value of p in accordance with the expression q=(p−1)/2). The method continues at step 406 where the processing module decrypts at least a decode threshold number of encrypted key shares to produce at least decode threshold number of key shares, wherein each encrypted key share is decrypted utilizing a corresponding key of the at least decode threshold number of keys. The method continues at step 408 where the processing module decodes the at least the decode threshold number of key shares utilizing a key share function (e.g., dispersed storage error decoding, a Shamir shared secret function) to produce a key. The method continues at step 410 where the processing module outputs the key to the requester.

FIG. 12B is a flowchart illustrating an example of retrieving an encrypted key share. The method begins with the step where a processing module (e.g., of a server, an authentication server, of a dispersed storage (DS) unit) receives an encrypted key share recovery request message. The method continues at step 414 where the processing module retrieves a corresponding secret exponent based on an alias name of the key share recovery request message. The method continues at step 416 where the processing module generates a blinded key based on the secret exponent, a blinded password of the encrypted key share recovery request message, and in accordance with an expression: blinded key $x=$(blinded password $x)^e_x$ modulo p. The method continues at step 418 where the processing module retrieves a corresponding encrypted key share (e.g., based on the alias name).

The method continues at step 420 where the processing module generates an encrypted key share recovery response message payload, wherein the payload includes the blinded key and the encrypted key share. The method continues at step 422 where the processing module generates a signature, utilizing a private key associated with the server, for the encrypted key share recovery response message payload. For example, the processing module generates a hash of the payload and encrypts the hash utilizing the private key of the authentication server to produce the signature. The method continues at step 424 where the processing module outputs an encrypted key share recovery response message that includes the encrypted key share recovery response message payload and the signature.

Figure 13:
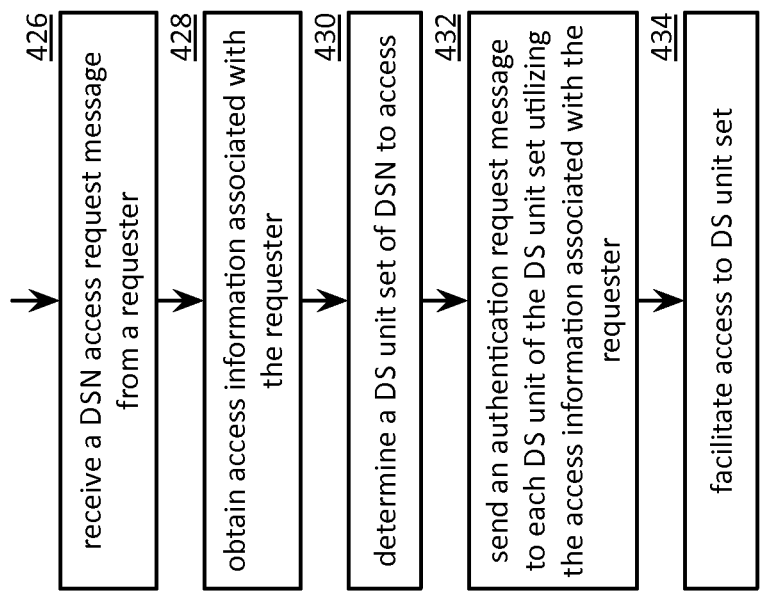
FIG. 13 is a flowchart illustrating an example of facilitating access to a dispersed storage network (DSN) in accordance with the present invention.

FIG. 13 is a flowchart illustrating an example of facilitating access to a dispersed storage network (DSN). The method begins at step 426 where a processing module receives a DSN access request message from a requester. The DSN access request message may include one or more of a request type, a user identifier (ID), a password, and a data ID (e.g., a data name, a data file pathname, a directory entry, a source name). The request type may include a read request, a write request, a delete request, a list request, etc.

The method continues at step 428 where the processing module obtains access information associated with the requester. The access information includes one or more of a private key, a signed certificate, a signed certificate chain, and a signature. The obtaining includes one or more of retrieving from a local memory, receiving from the requester, and facilitating execution of a dispersed key storage retrieval process (e.g., as discussed with reference to FIGS. 12A and 12B. For example, the processing module executes the dispersed key storage retrieval process to obtain the private key. As another example, the processing module sends a get key request message to a dispersed storage (DS) processing module and receives the private key in response.

The method continues at step 430 where the processing module determines a DS unit storage set of the DSN to access. The determination may be based on one or more of the user ID, a vault ID, the data ID, and a data ID to DS unit location table lookup. The method continues at step 432 where the processing module sends an authentication request message to each DS unit of the DS unit set utilizing the access information associated with the requester. For example, the processing module signs the authentication request utilizing the private key. The method continues at step 434 where the processing module facilitates access to the DS unit set. For example, the processing module writes data to the DS unit set. As another example, the processing module retrieves data from the DS unit set. The processing module may discard the access information when the access to the DS unit set is complete.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of a first computing device, the method comprises:
   obtaining, by the processing module, a second public key of a second computing device, wherein the second public key is part of a second public/private key pair of the second computing device;
   receiving, by the processing module, an encrypted secret exponent from the second computing device, wherein a secret exponent was encrypted using a shared secret key;
   determining, by the processing module, the shared secret key based on the second public key and a first private key of the first computing device using a first modulo prime polynomial function, wherein a first public key of the first computing device is generated from the first private key using a second modulo prime polynomial function and wherein the second public key is derived using the second modulo prime polynomial function on a second private key of the second public/private key pair;
   decrypting, by the processing module, the encrypted secret exponent using the shared secret key to recover the secret exponent;
   generating, by the processing module, an encryption key based on the secret exponent and a password;
   encrypting, by the processing module, a message using the encryption key to produce an encrypted message; and
   outputting, by the processing module, the encrypted message to the second computing device, wherein the second computing device generates the encryption key based on the secret exponent and the password.

2. The method of claim 1 further comprises:
   generating, the first public key using the second modulo prime polynomial function by:
      generating a primitive root polynomial "g";
      generating a prime "p"; and
      generating the first public key as a modulo "p" of "g" raised to a power of the first private key;
   wherein the second public key was generated by the second computing device by:
      generating the primitive root polynomial "g";
      generating the prime "p"; and
      generating the second public key as the modulo "p" of "g" raised to the power of the second private key.

3. The method of claim 1, wherein the generating the shared secret key comprises:
   obtaining a prime "p"; and
   generating the shared secret key as a modulo "p" of the second public key raised to a power of the first private key.

4. The method of claim 1, wherein the generating the shared secret key comprises:
   obtaining a prime "p";
   obtaining a constant "K";
   generating a shared secret as a modulo "p" of the second public key of the other entity raised to a power of the first private key; and
   generating the shared secret key based on the constant K and the shared secret.

5. The method of claim 1, wherein the encrypting the message comprises:
   encoding data in accordance with an encoding function to produce a set of encoded shares;
   for an encoded share of the set of encoded shares:
      generating the encryption key utilizing a mask generating function (MGF) in accordance with a formula of the encryption key equaling $(\text{MGF(the password)}^2)^{secret\ exponent}$ modulo a prime "p";
      encrypting the encoded share utilizing the encryption key to produce an encrypted share; and
      generating the message as a parameter package that includes the encrypted share and the secret exponent.

6. The method of claim 1, wherein generating the shared secret key comprises:
   outputting a key agreement request to the second computing device, wherein the key agreement request includes a primitive root polynomial "g", a prime "p", and the first public key; and
   receiving a key agreement response from the second computing device, wherein the key agreement response includes the second public key and authentication information.

7. A method for execution by a processing module of a first computing device, the method comprises:
   receiving, by the processing module, an encrypted message from a second computing device, wherein the second computing device encrypted a message using an encryption key to produce the encrypted message, and wherein the second computing device generated the encryption key based on a secret exponent and a password;
   receiving, by the processing module, an encrypted secret exponent, wherein the secret exponent is encrypted using a shared secret key, wherein the shared secret key is generated by the second computing device using a first modulo prime polynomial function on a first public key of the first computing device and a second private key of the second computing device;
   obtaining, by the processing module, a second public key of the second computing device, wherein the second public key is part of a second public/private key pair of the second computing device;
   generating, by the processing module, the shared secret key from the second public key and a first private key of the first computing device using the first modulo prime polynomial function, wherein the first public key is generated from the first private key using a second modulo prime polynomial function;
   decrypting, by the processing module, the encrypted secret exponent using the shared secret key to produce a decrypted secret exponent;
   generating, by the processing module, the encryption key based on the decrypted secret exponent and the password; and
   decrypting, by the processing module, the encrypted message using the encryption key to recapture a message.

8. The method of claim 7 further comprises:
   generating, the first public key using the second modulo prime polynomial function by:
      generating a primitive root polynomial "g";
      generating a prime "p"; and
      generating the first public key as a modulo "p" of "g" raised to a power of the first private key;
   wherein the second public key was generated by the second computing device by:
      generating the primitive root polynomial "g";
      generating the prime "p"; and
      generating the second public key as the modulo "p" of "g" raised to the power of the second private key.

9. The method of claim 7, wherein the generating the shared secret key comprises:
obtaining a prime "p"; and
generating the shared secret key as a modulo "p" of the public key of the second computing device raised to a power of the second private key.

10. The method of claim 7, wherein the generating the shared secret key comprises:
obtaining a prime "p";
obtaining a constant "K";
generating a shared secret as a modulo "p" of the second public key raised to a power of the first private key; and
generating the shared secret key based on the constant K and the shared secret.

11. The method of claim 7 further comprises:
verifying the message; and
when the message is verified, storing at least a portion of the message.

12. A dispersed storage (DS) module comprises:
a first module, when operable within a first computing device, causes the first computing device to:
obtain a second public key of a second computing device, wherein the second public key is part of a second public/private key pair of the second computing device;
receive an encrypted secret exponent from the second computing device, wherein a secret exponent was encrypted using a shared secret key;
determine the shared secret key from the second public key and a first private key of the computing device using a first modulo prime polynomial function, wherein a first public key of the first computing device is generated from the first private key using a second modulo prime polynomial function and wherein the second public key is derived using the second modulo prime polynomial function on a second private key of the second public/private key pair;
a second module, when operable within the first computing device, causes the first computing device to:
decrypt the encrypted secret exponent using the shared secret key to recover the secret exponent;
generate an encryption key based on the secret exponent and a password;
encrypt a message using the encryption key to produce an encrypted message; and
a third module, when operable within the first computing device, causes the first computing device to:
output the encrypted message to the second computing device, wherein the second computing device generates the encryption key based on the secret exponent and the password.

13. The DS module of claim 12 further comprises:
the first module, when operable within the first computing device, causes the first computing device to further generate the first public key using the second modulo prime polynomial function by:
generating a primitive root polynomial "g";
generating a prime "p"; and
generating the first public key as a modulo "p" of "g" raised to a power of the first private key;
wherein the second public key was generated by the second computing device by:
generating the primitive root polynomial "g";
generating the prime "p"; and
generating the second public key as the modulo "p" of "g" raised to the power of the second private key.

14. The DS module of claim 12, wherein the first module functions to generate the shared secret key by:
obtaining a prime "p"; and
generating the shared secret key as a modulo "p" of the second public key raised to a power of the first private key.

15. The DS module of claim 12, wherein the first module further functions to generate the shared secret key by:
obtaining a prime "p";
obtaining a constant "K";
generating a shared secret as a modulo "p" of the second public key raised to a power of the first private key; and
generating the shared secret key based on the constant K and the shared secret.

16. The DS module of claim 12, wherein the second module functions to encrypt the message by:
encoding data in accordance with an encoding function to produce a set of encoded shares;
for an encoded share of the set of encoded shares:
generating the encryption key utilizing a mask generating function (MGF) in accordance with a formula of the encryption key equaling $(MGF(\text{the password})^2)^{\text{secret exponent}}$ modulo a prime "p";
encrypting the encoded share utilizing the encryption key to produce an encrypted share; and
generating the message as a parameter package that includes the encrypted share and the secret exponent.

17. The DS module of claim 12, wherein the first module further functions to generate the shared secret key by:
outputting a key agreement request to the second computing device, wherein the key agreement request includes a primitive root polynomial "g", a prime "p", and the first public key; and
receiving a key agreement response from the second computing device, wherein the key agreement response includes the second public key and authentication information.

18. A dispersed storage (DS) module comprises:
a first module, when operable within a first computing device, causes the first computing device to:
receive an encrypted message from a second computing device, wherein the second computing device encrypted a message using an encryption key to produce the encrypted message, and wherein the second computing device generated the encryption key based on a secret exponent and a password;
receive an encrypted secret exponent, wherein the secret exponent is encrypted using a shared secret key, wherein the shared secret key is generated by the second computing device using a first modulo prime polynomial function on a first public key of the first computing device and a second private key of the second computing device; and
obtain a second public key of the second computing device, wherein the secret public key is part of a second public/private key pair of the second computing device;
a second module, when operable within the first computing device, causes the first computing device to:
generate the shared secret key from the second public key and a first private key of the first computing device using the first modulo prime polynomial function, wherein the first public key is generated from the first private key using a second modulo prime polynomial function; and
a third module, when operable within the first computing device, causes the first computing device to:

decrypt the encrypted secret exponent using the shared secret key to produce a decrypted secret exponent;

generate the encryption key based on the decrypted secret exponent and the password; and decrypt the encrypted message using the encryption key to recapture a message.

19. The DS module of claim 18 further comprises:

the second module, when operable within the first computing device, causes the first computing device to further generate the first public key using the second modulo prime polynomial function by:

generating a primitive root polynomial "g";

generating a prime "p"; and generating the first public key as a modulo "p" of "g" raised to a power of the first private key;

wherein the second public key was generated by the second computing device by:

generating the primitive root polynomial "g";

generating the prime "p"; and generating the second public key as the modulo "p" of "g" raised to the power of the second private key.

20. The DS module of claim 18, wherein the second module functions to generate the shared secret key by:

obtaining a prime "p"; and generating the shared secret key as a modulo "p" of the second public key raised to a power of the first private key.

21. The DS module of claim 18, wherein the second module functions to generate the shared secret key by:

obtaining a prime "p";

obtaining a constant "K";

generating a shared secret as a modulo "p" of the second public key raised to a power of the first private key; and generating the shared secret key based on the constant K and the shared secret.

22. The DS module of claim 18 further comprises:

a fourth module, when operable within the first computing device, causes the first computing device to:

verify the message; and when the message is verified, store at least a portion of the message.

* * * * *